US012792014B2

(12) United States Patent
Kirk et al.

(10) Patent No.: US 12,792,014 B2
(45) Date of Patent: Nov. 10, 2026

(54) SYSTEMS AND METHODS FOR TIME ESTIMATION FOR MACHINE FULL

(71) Applicant: Deere & Company, Moline, IL (US)

(72) Inventors: Ryan Kirk, Urbandale, IA (US); Mayur Deo, Warsaw, IN (US); Brian Rodriguez, Moline, IL (US)

(73) Assignee: Deere & Company, Moline, IL (US)

( * ) Notice: Subject to any disclaimer, the term of this patent is extended or adjusted under 35 U.S.C. 154(b) by 289 days.

(21) Appl. No.: 18/882,455

(22) Filed: Sep. 11, 2024

(65) Prior Publication Data

US 2025/0138508 A1 May 1, 2025

Related U.S. Application Data

(60) Provisional application No. 63/594,562, filed on Oct. 31, 2023.

(51) Int. Cl.
*G05B 19/4155* (2006.01)

(52) U.S. Cl.
CPC .................... *G05B 19/4155* (2013.01); *G05B 2219/45017* (2013.01)

(58) Field of Classification Search
CPC .................. G05B 19/4155; G05B 2219/45017
USPC ............................................................ 700/28
See application file for complete search history.

(56) References Cited

U.S. PATENT DOCUMENTS

| | | | | |
|---|---|---|---|---|
| 7,167,797 | B2 | 1/2007 | Faivre et al. | |
| 10,426,087 | B2 | 10/2019 | Bruns et al. | |
| 11,240,962 | B2 | 2/2022 | Kriebel et al. | |
| 2006/0200334 | A1 | 9/2006 | Faivre et al. | |
| 2007/0239337 | A1 | 10/2007 | Anderson | |
| 2009/0234695 | A1 | 9/2009 | Kapadi et al. | |
| 2013/0046525 | A1 * | 2/2013 | Ali | G05B 19/418 703/6 |
| 2019/0110394 | A1 * | 4/2019 | VanNahmen | A01D 34/006 |
| 2022/0039319 | A1 * | 2/2022 | Sheidler | A01D 41/1274 |
| 2023/0234559 | A1 * | 7/2023 | Potter | A01B 69/008 |

* cited by examiner

*Primary Examiner* — Jigneshkumar C Patel
(74) *Attorney, Agent, or Firm* — Christopher J. Volkmann; KELLY, HOLT & CHRISTENSON PLLC

(57) ABSTRACT

A computer implemented method includes identifying an estimated time until full (ETF) metric indicative of an estimated time it will take until a tank of an agricultural harvester is full, at least to a threshold level, based at least on a yield flow rate metric, a tank capacity metric, a tank fill level metric, a crop moisture metric, an error correction metric, a crop type metric, a temperature metric, a humidity metric, one or more historical yield flow rate metrics and a model; and generating one or more control signals based on the ETF metric. The computer implemented method can further include identifying an estimated full location (EFL) metric, indicative of an estimated location at the worksite at which the tank of the agricultural harvester will be full, at least to the threshold level, based at least on a path metric, a travel speed metric, and the ETF metric.

21 Claims, 16 Drawing Sheets

SYSTEMS AND METHODS FOR TIME ESTIMATION FOR MACHINE FULL

CROSS-REFERENCE TO RELATED APPLICATION

The present application is based on and claims the benefit of U.S. provisional patent application Ser. No. 63/594,562, filed Oct. 31, 2023, the content of which is hereby incorporated by reference in its entirety.

FIELD OF THE DESCRIPTION

The present description relates to worksite operations. More specifically, the present description relates to controlling worksite operations.

BACKGROUND

There are a wide variety of different types of worksite operations. Some such worksite operations include agricultural worksite operations. Agricultural worksite operation architectures can include a plurality of mobile agricultural work machines that operate at one or more agricultural worksites, such as one or more fields, to perform one or more agricultural worksite operations. The plurality of mobile agricultural work machines can be controlled to coordinate the performance of the one or more agricultural worksite operations in an effort to efficiently distribute the mobile agricultural work machines to complete the one or more agricultural worksite operations efficiently.

The discussion above is merely provided for general background information and is not intended to be used as an aid in determining the scope of the claimed subject matter.

SUMMARY

A computer implemented method includes identifying an estimated time until full (ETF) metric indicative of an estimated time it will take until a tank of an agricultural harvester is full, at least to a threshold level, based at least on a yield flow rate metric, a tank capacity metric, a tank fill level metric, a crop moisture metric, an error correction metric, a crop type metric, a temperature metric, a humidity metric, one or more historical yield flow rate metrics and a model; and generating a control signal based on the ETF metric. The computer implemented method can further include identifying an estimated full location (EFL) metric, indicative of an estimated location at the worksite at which the tank of the agricultural harvester will be full, at least to the threshold level, based at least on a path metric, a travel speed metric, and the ETF metric.

An agricultural worksite operation system is configured to identify an estimated time until full (ETF) metric indicative of an estimated time it will take until a tank of an agricultural harvester is full, at least to a threshold level, based at least on a yield flow rate metric, a tank capacity metric, a tank fill level metric, a crop moisture metric, an error correction metric, a crop type metric, a temperature metric, a humidity metric, one or more historical yield flow rate metrics and a model; and to generate a control signal based on the ETF metric. The agricultural worksite operation system is further configured to identify an estimated full location (EFL) metric, indicative of an estimated location at the worksite at which the tank of the agricultural harvester will be full, at least to the threshold level, based at least on a path metric, a travel speed metric, and the ETF metric.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
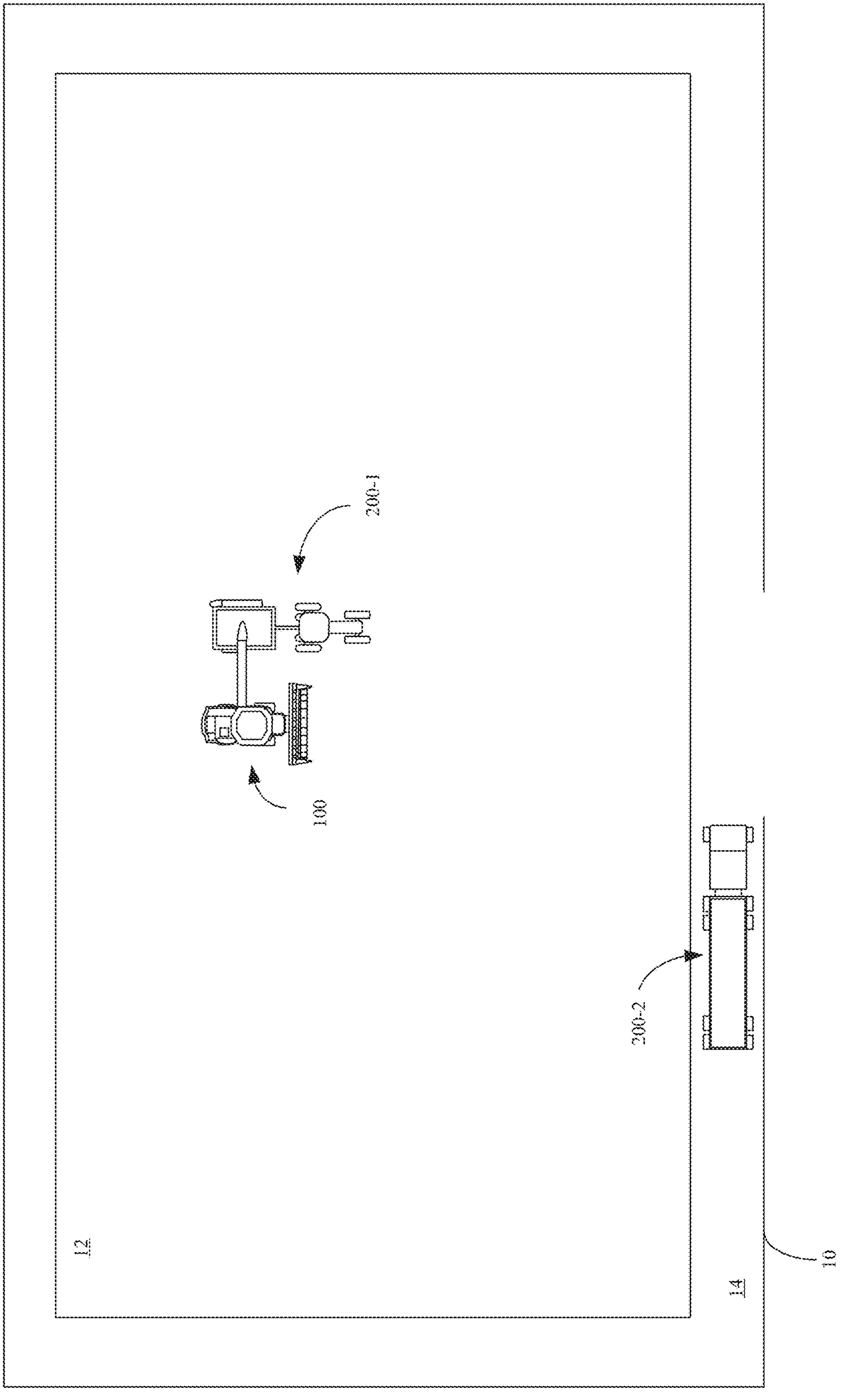
FIG. 1 is a pictorial illustration showing an example agricultural worksite operation at an example agricultural worksite.

For the purpose of promoting an understanding of the principles of the present disclosure, reference will now be made to the examples illustrated in the drawings, and specific language will be used to describe the same. It will nevertheless be understood that no limitation of the scope of the disclosure is intended. Any alterations and further modifications to the described devices, systems, methods, and any further application of the principles of the present disclosure are fully contemplated as would normally occur to one skilled in the art to which the disclosure relates. In particular, it is fully contemplated that the features, components, and/or steps described with respect to one example may be combined with the features, components, and/or steps described with respect to other examples of the present disclosure.

An agricultural operation system architecture can include a variety of different mobile agricultural work machines that operate at one or more agricultural worksites (e.g., one or more fields) to perform one or more agricultural worksite operations. For example, an agricultural operation system architecture can include a variety of different mobile agricultural work machines that operate at one or more fields to perform an agricultural worksite operation.

One type of agricultural worksite operation is a harvesting operation. During a harvesting operation, one or more mobile agricultural harvesting machines harvest crop at one or more fields. One or more material receiving machines (e.g., towed grain cart, towed grain trailers, etc.) coordinate to receive harvested material from the mobile agricultural harvesting machines and to transport the harvested material from the one or more fields to a delivery location (e.g., dryer, storage location, purchasing facility, such as a grain mill, etc.).

It can be difficult for the manager(s) of an agricultural operation system architecture to effectively plan and schedule a harvesting operation, distribute the plurality of different mobile agricultural work machines (e. g., agricultural harvesters and material receiving machines) across the one or more fields to efficiently complete the harvesting operation, and control machine settings to efficiently complete the harvesting operation.

As an agricultural harvester harvests crop at a field, clean grain is loaded into a grain tank on-board the agricultural harvester. A material receiving machine, such as a towed grain cart, is controlled to rendezvous with the agricultural harvester such that the harvested material can be transferred from the grain tank on-board the agricultural harvester to the material receptacle of the towed grain cart. Ideally, the transferring begins when the on-board grain tank is full (at least to a threshold level) and takes place while the agricultural harvester continues to travel and harvest crop. Transferring while on the move is sometimes referred to as an in-tandem transfer operation. Once the agricultural harvester has been emptied (or has otherwise transferred a desired amount of material), the towed grain cart will travel to another location, such as to another material receiving machine (e. g., a towed grain trailer) or to another location, to transfer the grain from the material receptacle of the towed grain cart to another location (e.g., material receptacle of the towed grain trailer). The towed grain cart, once emptied, will then be available to return to the agricultural harvester (or to another agricultural harvester) to receive more harvested material. Eventually, the towed grain trailer will become full and will leave the field to deliver material to another location and is either replaced by another towed grain trailer or returns to the field after delivering material, or both. This logistical scheme continues until the harvesting operation at the field is complete.

Ideally, the agricultural harvesting operation is performed without any downtime for the agricultural harvesters. However, it can be difficult to efficiently schedule and control the material receiving machines to rendezvous with the agricultural harvesters at the ideal times (such that material transfer can begin when the agricultural harvester is full, or even slightly before full). When an agricultural harvester becomes full without a material receiving machine available for material transfer, the agricultural harvester will stop harvesting and wait for a material receiving machine to become available. This downtime increases the cost of the operation and may lead to other deleterious effects.

For instance, there may only be short windows of time during which ideal harvesting (e.g., harvesting crop when the crop is at desired moisture levels) can be completed. Downtime for the agricultural harvesters reduces the amount of crop that can be harvested during the short windows of time and can lead to more crop being harvested at less than ideal times (e.g., when the crop is not at desired moisture levels). A producer can be docked (i.e., paid less money) by a purchasing facility for harvested crop that exceeds a desired moisture range. Thus, the producer will either make less money at the purchasing facility or will be required to run the crop through a dryer to bring the crop within the desired moisture range. Running the dryer increases costs. Crop that is too dry (i.e., is below the desired moisture range), will result in less pay from the purchasing facility. The purchasing facility pays for crop by weight. Crop that is less moist will weigh less than the same crop that is more moist. As the purchasing facility is willing to pay full price for any crop within a given moisture range, it is best to have the crop at the top end of that given moisture range (for purposes of weight) or at least within the range so as not to be docked or to have less payable weight for the same crop. This is merely one example of a deleterious effect that may result from downtime during a harvesting operation.

In order to properly plan and schedule material transfer operations, it is useful for the operation manager(s) to know where and when the agricultural harvesters will be full (e. g., full at least to a threshold level). Some current systems utilize sensors on-board the agricultural harvester to estimate a volumetric fill level of the on-board grain tank. However, these estimations can be prone to error because of variance in grain moisture, humidity, temperature, crop type, as well as other factors. Thus, current systems may provide erroneous estimated fill levels that may result in an agricultural harvester being emptied prior to being full (at least to a threshold level) which is less efficient or may result in overfilling of the on-board grain tank, and potentially material spill or downtime of the agricultural harvester or both.

The present disclosure proceeds with example systems and methods operable to calculate an estimated time until full (ETF) metric indicative of a time until a material receptacle on an agricultural work machine, such as an on-board grain tank of an agricultural harvester, will be full. The ETF metric can further be used, along with various other data (e.g., travel speed and route or heading information) to generate an estimated full location (EFL) metric indicative of a location at which a material receptacle on an agricultural work machine, such as an on-board grain tank of an agricultural harvester, will be full. The ETF metric and the EFL metric account for historical performance indicative of historical ETF metrics and further account for predictive data indicative of expected values ahead of the agricultural harvester. Further, the ETF and EFL account for variation that may occur due to differences in crop type, grain moisture, humidity, temperature, and other factors.

It will be understood that while various examples detailed herein proceed in the context of agricultural operations and agricultural work machines the systems and methods described herein are applicable to and can be used in various other types of off-road operations and off-road machines, such as, but not limited to, construction operations and construction work machines, turf management operations and turf management machines, and forestry operations and forestry machines.

FIG. 1 is a pictorial illustration showing one agricultural worksite operation. FIG. 1 illustrates an in in the form of a harvesting operation in which a plurality of mobile off-road work machines in the form of mobile agricultural work machines harvest at an example field 102. Field 10 includes crop area 12 and non-crop area 14. The mobile agricultural work machines shown in FIG. 1 include an agricultural harvester 100, a first material receiving machine 200 (illustratively 200-1) in the form of a towed grain cart, and a second material receiving machine 200 (illustratively 200-2) in the form of a towed grain trailer.

Figure 2:
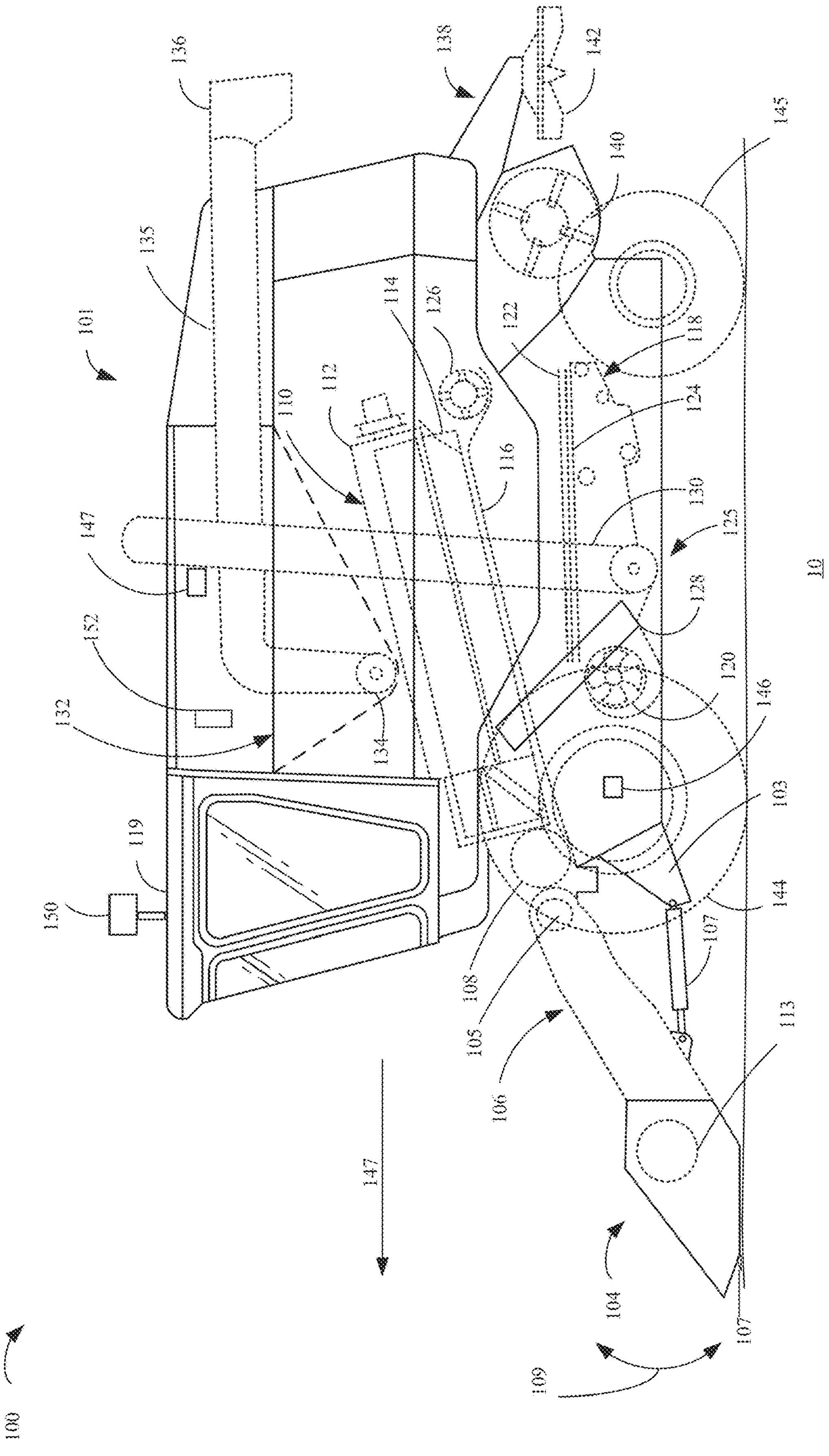
FIG. 2 is a partial pictorial, partial schematic illustration showing an example agricultural harvester.

FIG. 2 is partial pictorial, partial schematic illustration of agricultural harvester 100. In the example shown in FIGS. 1-2, agricultural harvester is in the form of a combine harvester. As illustrated in FIG. 2, harvester 100 includes ground engaging traction elements (wheels or tracks) 144 and 145 which can be driven by a propulsion subsystem (e.g., motor or engine and other drivetrain elements) to propel harvester 100 across a worksite 10 (e.g., a field). Harvester 100 includes an operator compartment or cab 119, which can include a variety of different operator interface mechanisms (e.g., 418 shown in FIG. 4) for controlling harvester 100 as well as for displaying various information. Harvester 100 includes a feeder house 106, a feed accelerator 108, and a thresher generally indicated at 110. The feeder house 106 and the feed accelerator 108 form part of a material handling subsystem 125. Header 104 is pivotally coupled to a frame 103 of harvester 101 along pivot axis 105. One or more actuators 107 drive movement of header 104 about axis 105 in the direction generally indicated by arrow 109. Thus, a vertical position of header 104 (the header height) above ground 111 over which the header 104 travels is controllable by actuating actuator 107. While not shown in FIG. 1, agricultural harvester 100 may also include one or more actuators that operate to apply a tilt angle, a roll angle, or both to the header 104 or portions of header 104.

Agricultural harvester 100 includes a material handling subsystem 125 that includes a thresher 110 which illustratively includes a threshing rotor 112 and a set of concaves 114. Further, material handling subsystem 125 also includes a separator 116. Agricultural harvester 100 also includes a cleaning subsystem or cleaning shoe (collectively referred to as cleaning subsystem 118) that includes a cleaning fan 120, chaffer 122, and sieve 124. The material handling subsystem 125 also includes discharge beater 126, tailings elevator 128, and clean grain elevator 130. The clean grain elevator moves clean grain into a material receptacle (or clean grain tank) 132.

Harvester 100 also includes a material transfer subsystem that includes a conveying mechanism 134 and a chute 135. Chute 135 includes a spout 136. In some examples, spout 136 can be movably coupled to chute 135 such that spout 136 can be controllably rotated to change the orientation of spout 136. Conveying mechanism 134 can be a variety of different types of conveying mechanisms, such as an auger or blower. Conveying mechanism 134 is in communication with clean grain tank 132 and is driven (e.g., by an actuator, such as motor or engine) to convey material from grain tank 132 through chute 135 and spout 136. Chute 135 is rotatable through a range of positions from a storage position (shown in FIG. 2) to a variety of deployed positions away from agricultural harvester 100 to align spout 136 relative to a material receptacle of a material receiving machine 200 that is configured to receive the material within grain tank 132. One example of such a deployed position is shown in FIG. 1. Spout 136, in some examples, is also rotatable to adjust the direction of the material stream exiting spout 136.

Harvester 100 also includes a residue subsystem 138 that can include chopper 140 and spreader 142. Harvester 101 also includes a propulsion subsystem that includes an engine (or other form of power plant) that drives ground engaging traction components, such as 144 or 144 and 145 to propel the harvester 100 across a worksite such as a field (e.g., ground 111). In some examples, a harvester within the scope of the present disclosure may have more than one of any of the subsystems mentioned above. In some examples, harvester 100 may have left and right cleaning subsystems, separators, etc., which are not shown in FIG. 1.

In operation, and by way of overview, harvester 100 illustratively moves through a field 10 in the direction indicated by arrow 147. As harvester 100 moves, header 104 engages the crop plants to be harvested and cuts, with a cutter bar 107 on the header 104, the crop plants to generate cup crop material.

The cut crop material is engaged by a cross auger 113 which conveys the separated crop material to a center of the header 104 where the severed crop material is then moved through a conveyor in feeder house 106 toward feed accelerator 108, which accelerates the separated crop material into thresher 110. The separated crop material is threshed by rotor 112 rotating the crop against concaves 114. The threshed crop material is moved by a separator rotor in separator 116 where a portion of the residue is moved by discharge beater 126 toward the residue subsystem 138. The portion of residue transferred to the residue subsystem 138 is chopped by residue chopper 140 and spread on the field by spreader 142. In other configurations, the residue is released from the agricultural harvester 101 in a windrow.

Grain falls to cleaning subsystem 118. Chaffer 122 separates some larger pieces of MOG from the grain, and sieve 124 separates some of finer pieces of MOG from the grain. The grain then falls to an auger that moves the grain to an inlet end of grain elevator 130, and the grain elevator 130 moves the grain upwards, depositing the grain in grain tank 132. Residue is removed from the cleaning subsystem 118 by airflow generated by cleaning fan 120. Cleaning fan 120 directs air along an airflow path upwardly through the sieves and chaffers. The airflow carries residue rearwardly in harvester 101 toward the residue handling subsystem 138.

Tailings elevator 128 returns tailings to thresher 110 where the tailings are re-threshed. Alternatively, the tailings also may be passed to a separate re-threshing mechanism by a tailings elevator or another transport device where the tailings are re-threshed as well.

Harvester 100 can include a variety of sensors, some of which are illustrated in FIG. 1, such as ground speed sensor 146, one or more mass flow sensors 147, and one or more material observation sensor systems 150, and one or more fill level sensors 152.

Ground speed sensor 146 senses the travel speed of harvester 101 over the ground. Ground speed sensor 146 may sense the travel speed of the harvester 100 by sensing the speed of rotation of the ground engaging traction elements 144 or 145, or both, a drive shaft, an axle, or other components. In some instances, the travel speed may be sensed using a positioning system, such as a global positioning system (GPS), a dead reckoning system, a long-range navigation (LORAN) system, a Doppler speed sensor, or a wide variety of other systems or sensors that provide an indication of travel speed. Ground speed sensors 146 can also include direction sensors such as a compass, a magnetometer, a gravimetric sensor, a gyroscope, GPS derivation, to determine the direction of travel in two or three dimensions in combination with the speed. This way, when harvester 100 is on a slope, the orientation of harvester 100 relative to the slope is known. For example, an orientation of harvester 100 could include ascending, descending or transversely travelling the slope.

Mass flow sensors 147 sense the mass flow of material (e.g., grain) through clean grain elevator 130. Mass flow sensors 147 may be disposed at various locations, such as within or at the outlet of clean grain elevator 130. In some examples, the mass flow rate of material sensed by mass flow sensors 147 is used in the calculation of yield as well as in the calculation of the fill level of the on-board material tank 132. In some examples, mass flow sensors 147 include an impact (or strike) plate that is impacted by material (e.g., grain) conveyed by clean grain elevator 130 and a force or load sensor that detects the force or load of impact of the material on the impact (or strike) plate. This is merely one example of a mass flow sensor.

Observation sensor systems 150 can include one or more of a variety of sensors, such as cameras (e.g., mono or stereo cameras), Lidar, Radar, Ultrasonic sensors, as well as various other sensor configured to emit and/or receive electromagnetic radiation, as well as a variety of other sensors. Observation sensor systems 150 illustratively observe the worksite 10, items at the worksite 10 (e.g., vegetation, including crops at the worksite), and portions of the harvester 100 to detect various characteristics. While FIG. 1 shows some example positions of observation sensor system 150, it will be understood that observation sensor systems 150 can be positioned (or otherwise disposed) at a variety of other locations on harvester 100.

Fill level sensors 152 can include one or more of a variety of sensors, such as contact sensors and non-contact sensors. Fill level sensors 152 detect a fill level of grain in grain tank 132. Fill level sensors 152, in the form of contact sensors, include paddles (or other contact members) that are contacted by the grain and the displacement of the contact members or force or load of impact of the material on the contact member can be detected to determine presence of grain material at the level of the tank corresponding to the sensor. Fill level sensors 152, in the form of non-contact sensors, may be configured to capture electromagnetic radiation to detect presence of grain at the level of the tank corresponding to the sensor. In some examples, fill level sensors 152 are configured to alert an operator when the harvester 100 is full (or is approaching full). These are merely some examples. While FIG. 1 shows some example positions of fill level sensors 152, it will be understood that fill level sensors 152 can be positioned (or otherwise disposed) at a variety of other locations on harvester 100.

Harvester 101 can include various other sensors, some of which will be discussed below.

Figure 3:
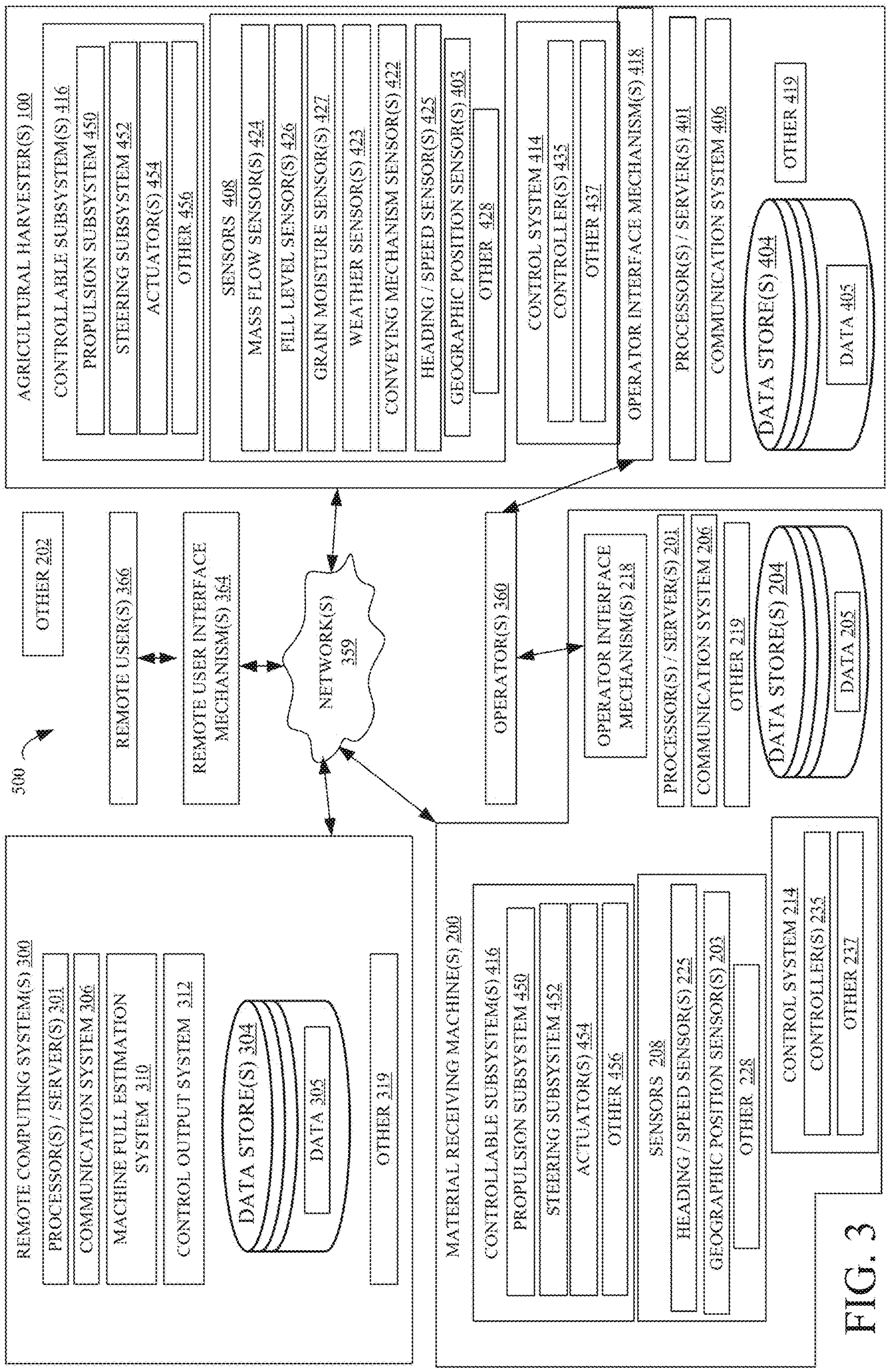
FIG. 3 is a block diagram of one example agricultural worksite operation system architecture.

FIG. 3 is a block diagram showing one example worksite operation system architecture 500 (e.g., agricultural worksite operation system architecture 500). Worksite operation system architecture 500 is also called worksite operation system 500). Worksite operation system 500 includes one or more off-road mobile work machines, illustratively one or more agricultural harvesters 100 and one or more material receiving machines 200. Worksite operation system 500 also includes one or more remote computing systems 300, one or more networks 359, one or more remote user interface mechanisms 364, and can include a variety of other items 202 as well.

Each agricultural harvester 100, itself, illustratively includes one or more processors or servers 401, one or more data stores 404, communication system 406, one or more sensors 408, control system 414, one or more controllable subsystems 416, one or more operator interface mechanisms 418, and can include various other items and functionality 419 as well.

Each material receiving machine 200, itself, illustratively includes one or more processors or servers 201, one or more data stores 204, communication system 206, one or more sensors 208, control system 214, one or more controllable subsystems 216, one or more operator interface mechanisms 218, and can include various other items and functionality 219 as well.

Remote computing systems 300, as illustrated, include one or more processors or servers 301, one or more data stores 304, communication system 306, machine full estimation system 310, control output system 312, and can include various other items and functionality 319.

Data stores 204, data stores 304, or data stores 404, or all three, store a variety of data (generally indicated as data 205, data 305, and data 405 respectively), some of which will be described in more detail herein. For example, data 205, data 305, or data 405, or all three, can include, among other things, worksite data, sensor data, machine data, historical data, models, including machine learned models, as well as various other data. Additionally, data 205 can include computer executable instructions that are executable by one or more processors or servers 201 to implement other items or functionalities of worksite operation system 500 (e.g., other items or functionalities of material receiving machines 200, etc.). Additionally, data 305 can include computer executable instructions that are executable by one or more processors or servers 301 to implement other items or functionalities of worksite operation system 500 (e.g., other items or functionalities of remote computing systems 300, etc.). Additionally, data 405 can include computer executable instructions that are executable by one or more processors or servers 301 to implement other items or functionalities of worksite operation system 500 (e.g., other items or functionalities of agricultural harvesters 100, etc.). It will be understood that data stores 204, data stores 304, or data stores 404, or all three, can include different forms of data stores, for instance both volatile data stores (e.g., Random Access Memory (RAM)) and non-volatile data stores (e.g., Read Only Memory (ROM), hard drives, solid state drives, etc.).

Sensors 408 can include mass flow sensors 424, fill level sensors 426, heading/speed sensors 425, moisture sensors 427, weather sensors 423, conveying mechanism sensors 222, geographic position sensors 403, and can include various other sensors 428 as well. The sensor data generated by sensors 408 can be communicated to remote computing systems 300, to material receiving machines 200, and to other items of agricultural harvester 100. Control system 414, itself, can include one or more controllers 435 for controlling various other items of agricultural harvester 100, and can include other items 437 as well. Controllable subsystems 416 can include propulsion subsystem 450, steering subsystem 452, actuators 454, and can include various other subsystems 456 as well.

Sensors 208 can include heading/speed sensors 225, geographic position sensors 203, and can include various other sensors 228 as well. The sensor data generated by sensors 208 can be communicated to remote computing systems 300, to agricultural harvesters 100, and to other items of material receiving machines 200. Control system 214, itself, can include one or more controllers 235 for controlling various other items of material receiving machine 200, and can include other items 237 as well. Controllable subsystems 216 can include propulsion subsystem 250, steering subsystem 252, actuators 254, and can include various other subsystems 256 as well.

Conveying mechanism sensors 222 detect characteristics indicative of conveying mechanism 134 (e.g., auger, blower, etc.) operation, such as whether or not the conveying mechanism is operating, the operating speed of the conveying mechanism, as well as other characteristics. Sensor data generated by conveying mechanism sensors 222 can be used to determine a state of the conveying mechanism (e.g., whether the conveying mechanism is operating or not operating). Conveying mechanism sensors 222 can include hall effect sensors configured to detect rotation and speed of rotation of the conveying mechanism 134 or of a component connected, or otherwise used in driving the conveying mechanism 134. Conveying mechanism sensors 222 can include various other types of sensors.

Weather sensors 423 detect weather characteristics of the worksite, such as temperature, humidity, as well as various other weather characteristics. Weather sensors 423 can include temperature sensors, such as thermometers, thermistors, or various other types of temperature sensors, that detect the ambient temperature of the worksite. Weather sensors 423 can include humidity sensors, such as capacitive humidity sensors, or various other types of humidity sensors, that detect the ambient humidity of the worksite. Weather sensors 423 can include various other types of sensors to detect various other weather characteristics, including, but not limited to, sensors configured to detect wind characteristics (e.g., wind speed and direction) and sensors configured to detect precipitation characteristics (e.g., precipitation presence and accumulation). These are merely some examples. In some examples, alternatively, or additionally, communication system 406 can obtain weather data for the worksite from external sources, such as the Internet or a local weather station, or various other sources.

Grain moisture sensors 427 detect a moisture level of grain harvested by agricultural harvester 100. The grain moisture sensors 423 can include capacitive moisture sensors or another type of moisture sensor, such as a moisture sensor that measures a characteristic of electromagnetic radiation that passes through or reflects from grain. These are merely some examples.

Mass flow sensors 424 detect a mass flow of material (e.g., grain) into a material receptacle (e.g., grain tank 132) of an agricultural harvester 100. The mass flow sensors 424 can comprise one or more impact sensors, positioned in the clean grain elevator 130, that are impacted by material (grain) as the material is flowing into the grain tank 132. In other examples, the mass flow sensors 324 can be other types of flow sensing devices such as non-contact sensors, for instance, electromagnetic (EM) radiation sensing devices that generate EM radiation that is directed through the material flow and receive the EM radiation that flows through or is reflected from the material flow. In one example, mass flow sensors 424 are similar to mass flow sensors 147. These are merely some examples.

Fill level sensors 426 detect a fill level of material (e.g., grain) in a material receptacle (e.g., grain tank 132) of an agricultural harvester 100. The fill level sensors 426 can comprise contact sensors having a contact member configured to be contacted by the grain in the grain tank 132 and the displacement of the contact member or force or load of impact of the material on the contact member can be detected to determine presence of grain material at the level of the tank corresponding to the sensor. Fill level sensors 426 can comprise non-contact sensors configured to capture electromagnetic radiation to detect presence of grain at the level of the tank corresponding to the sensor. In one example, fill level sensors 426 are similar to fill level sensors 452. These are merely some examples.

Heading/speed sensors 425 detect a heading characteristic (e.g., travel direction) or speed characteristic (e.g., travel speed, acceleration, deceleration, etc.), or both, of an agricultural harvester 100. Heading/speed sensors 225 detect a heading characteristic (e.g., travel direction) or speed characteristic (e.g., travel speed, acceleration, deceleration, etc.), or both, of a receiving machine 200 This can include sensors that sense the movement (e.g., rotation) of ground-engaging elements (e.g., Wheels or tracks) or movement of components coupled to the ground engaging elements (e.g., axles) or other elements, or can utilize signals received from other sources, such as geographic position sensors. Thus, While heading/speed sensors 425 as described herein are shown as separate from geographic position sensors 403, in some examples, machine heading/speed is derived from signals received from geographic position sensors 403 and subsequent processing. In other examples, heading/speed sensors 425 are separate sensors and do not utilize signals received from other sources. Similarly, While heading/speed sensors 225 as described herein are shown as separate from geographic position sensors 203, in some examples, machine heading/speed is derived from signals received from geographic position sensors 203 and subsequent processing. In other examples, heading/speed sensors 225 are separate sensors and do not utilize signals received from other sources.

Geographic position sensors 403 illustratively sense or detect the geographic position or location of an agricultural harvester 100. Geographic position sensors 203 illustratively sense or detect the geographic position or location of a material receiving machine 200. Geographic position sensors 403 and 203 can include, but are not limited to, a global navigation satellite system (GNSS) receiver that receives signals from a GNSS satellite transmitter. Geographic position sensors 403 and 203 can also include a real-time kinematic (RTK) component that is configured to enhance the precision of position data derived from the GNSS signal. Geographic position sensors 403 and 203 can include a dead reckoning system, a cellular triangulation system, or any of a variety of other geographic position sensors.

Sensors 408 can also include various other types of sensors 428. For example, but not by limitation, sensors 428 can include sensors configured to detect Whether or not an implement (e.g., header 104) of the agricultural harvester is engaged, such as sensors configured to detect movement, or a characteristic of movement (e.g., speed), of a crop engaging component of the implement or movement, or a characteristic of movement (e. g., speed), of a component (e.g., shaft, motor, etc.) used to drive one or more crop engaging components of the implement. Sensors 208 can also include various other types of sensors 228.

Control system 414 can include a variety of controllers 435, such as a communication system controller to control communication system 406, an interface controller to control one or more interface mechanisms (e.g., 418 or 364, or both), a propulsion controller to control propulsion subsystem 450 to control a travel speed of an agricultural harvester 100, a path planning controller to control steering subsystem 452 to control a route or heading of an agricultural harvester 100, and one or more actuator controllers to control operation of actuators 454. Control system 214 can include a variety of controllers 235, such as a communication system controller to control communication system 206, an interface controller to control one or more interface mechanisms (e.g., 218 or 364, or both), a propulsion controller to control propulsion subsystem 250 to control a travel speed of a material receiving machine 200, and a path planning controller to control steering subsystem 252 to control a route or heading of a material receiving machine 200.

Propulsion subsystem 450 includes one or more actuators (e. g., internal combustion engine, motors, pumps, etc.) that drive the ground engaging traction elements (e.g., Wheels or tracks) of an agricultural harvester 100. Propulsion subsystem 250 includes one or more actuators (e.g., internal combustion engine, motors, pumps, etc.) that drive the ground engaging traction elements (e. g., Wheels or tracks) of a material receiving machine 200.

Steering subsystem 452 includes one or more actuators (e.g., electric actuators, hydraulic actuators, etc.) that are controllably actuatable to control the steering and thus heading of an agricultural harvester 100. Steering subsystem 252 includes one or more actuators (e.g., electric actuators, hydraulic actuators, etc.) that are controllably actuatable to control the steering and thus heading of a material receiving machine 200.

Actuators 454 include a variety of different types of actuators that control operation of one or more components of an agricultural harvester 100. Actuators 454 may include actuators that control the position or orientation of components of an agricultural harvester 100 as well as actuators that control a speed of components of an agricultural harvester 100. Actuators 454 can include, without limitation, motors, valves, pumps, hydraulic actuators (e.g., hydraulic cylinders, etc.), pneumatic actuators (e.g., pneumatic cylinders, etc.), electric actuators (e.g., linear actuators, etc.), as well as various other types of actuators.

Communication system 406 is used to communicate between components of an agricultural harvester 100 or with other items of worksite operation system 500, such as remote computing systems 300, material receiving machines 200, or other agricultural harvesters 100, or a combination thereof. Communication system 206 is used to communicate between components of a material receiving machine 100 or with other items of worksite operation system 500, such as remote computing systems 300, agricultural harvesters 100, or other material receiving machines 200, or a combination thereof. Communication system 306 is used to communicate between components of a remote computing system 300 or with other items of worksite operation system 500, such as agricultural harvesters 100, material receiving machines 200, or other remote computing systems 300, or a combination thereof.

Communication systems 206, 306, and 406 can each include one or more of wired communication circuitry and wireless communication circuitry, as well as wired and wireless communication components. In some examples, communication systems 206, 306, and 406 can each be a cellular communication system, a system for communicating over a wide area network or a local area network, a system for communicating over a controller area network (CAN), such as a CAN bus, a system for communication over a near field communication network, or a communication system configured to communicate over any of a variety of other networks. Communication systems 206, 306, and 406 can each also include a system that facilitates downloads or transfers of information to and from a secure digital (SD) card or a universal serial bus (USB) card, or both. Communication systems 206, 306, and 406 can each utilize network 359. Networks 359 can be any of a wide variety of different types of networks such as the Internet, a cellular network, a wide area network (WAN), a local area network (LAN), a controller area network (CAN), a near-field communication network, or any of a wide variety of other networks or communication systems.

FIG. 3 also shows that remote computing systems 200 include machine full estimation system 310. Machine full system 310 generates one or more machine full estimation outputs, such as one or more estimated time until full (ETF) outputs or one or more estimate full location (EFL) outputs, or both. Machine full estimation system 310 and the machine full estimation outputs will be discussed in greater detail further below. FIG. 3 also shows that remote computing systems 300 include control output system 312. Control output system 312 generates and outputs one or more control outputs useable to control one or more agricultural harvesters 100 or one or more material receiving machines 200, or both. The control outputs can include routes, scheduling (e. g., identifying where to be and when to be there), as well as settings of one or more agricultural harvesters 100 (e.g., settings of one or more of the controllable subsystems 416) or settings of one or more material receiving machines 200 (e.g., settings of one or more of the controllable subsystems 216), or both. Control output system 312 will be described in greater detail below.

FIG. 3 also shows remote users 366 interacting with agricultural harvesters 100, material receiving machines 200, and remote computing systems 300 through user interface mechanisms 364 over networks 359. In some examples, user interface mechanisms 364 may include joysticks, levers, a steering wheel, linkages, pedals, buttons, wireless devices (e.g., mobile computing devices, etc.), dials, keypads, a display device, user actuatable elements (such as icons, buttons, etc.) on a user interface display device, a microphone and speaker (where speech recognition and speech synthesis are provided), among a wide variety of other types of control devices. Where a touch sensitive display system is provided, the users 366 may interact with user interface mechanisms 364 using touch gestures. These examples described above are provided as illustrative examples and are not intended to limit the scope of the present disclosure. Consequently, other types of user interface mechanisms 364 may be used and are within the scope of the present disclosure.

FIG. 3 also shows that one or more operators 360 may operate agricultural harvesters 100 and material receiving machines 200. The operators 360 interact with operator interface mechanisms 418 or operator interface mechanisms 218. In some examples, operator interface mechanisms 418 and operator interface mechanisms 218 may each include joysticks, levers, a steering wheel, linkages, pedals, buttons, wireless devices (e.g., mobile computing devices, etc.), dials, keypads, a display device, user actuatable elements (such as icons, buttons, etc.) on a user interface display device, a microphone and speaker (where speech recognition and speech synthesis are provided), among a wide variety of other types of control devices. Where a touch sensitive display system is provided, the operators 360 may interact with operator interface mechanisms 418 or 218 using touch gestures. These examples described above are provided as illustrative examples and are not intended to limit the scope of the present disclosure. Consequently, other types of operator interface mechanisms 418 and operator interface mechanisms 218 may be used and are within the scope of the present disclosure.

Remote computing systems 200 can be a wide variety of different types of systems, or combinations thereof. For example, remote computing systems 300 can be in a remote server environment. Further, remote computing systems 300 can be remote computing systems, such as mobile devices, a remote network, a farm manager system, a vendor system, or a wide variety of other remote systems. In one example, agricultural harvesters 100 can be controlled remotely by remote computing systems 200 or by remote users 366, or both. In one example, material receiving machines 200 can be controlled remotely by remote computing systems 200 or by remote users 366, or both.

In some examples, one or more of the components shown in FIG. 3 as being disposed on remote computing systems 300 can additionally, or alternatively, be located elsewhere, such as at agricultural harvesters 100 or material receiving machines 200, or both. Thus, it will be understood that the items in worksite operation system 500 can be distributed in various ways, including ways that differ from the example shown in FIG. 3.

Figure 4:
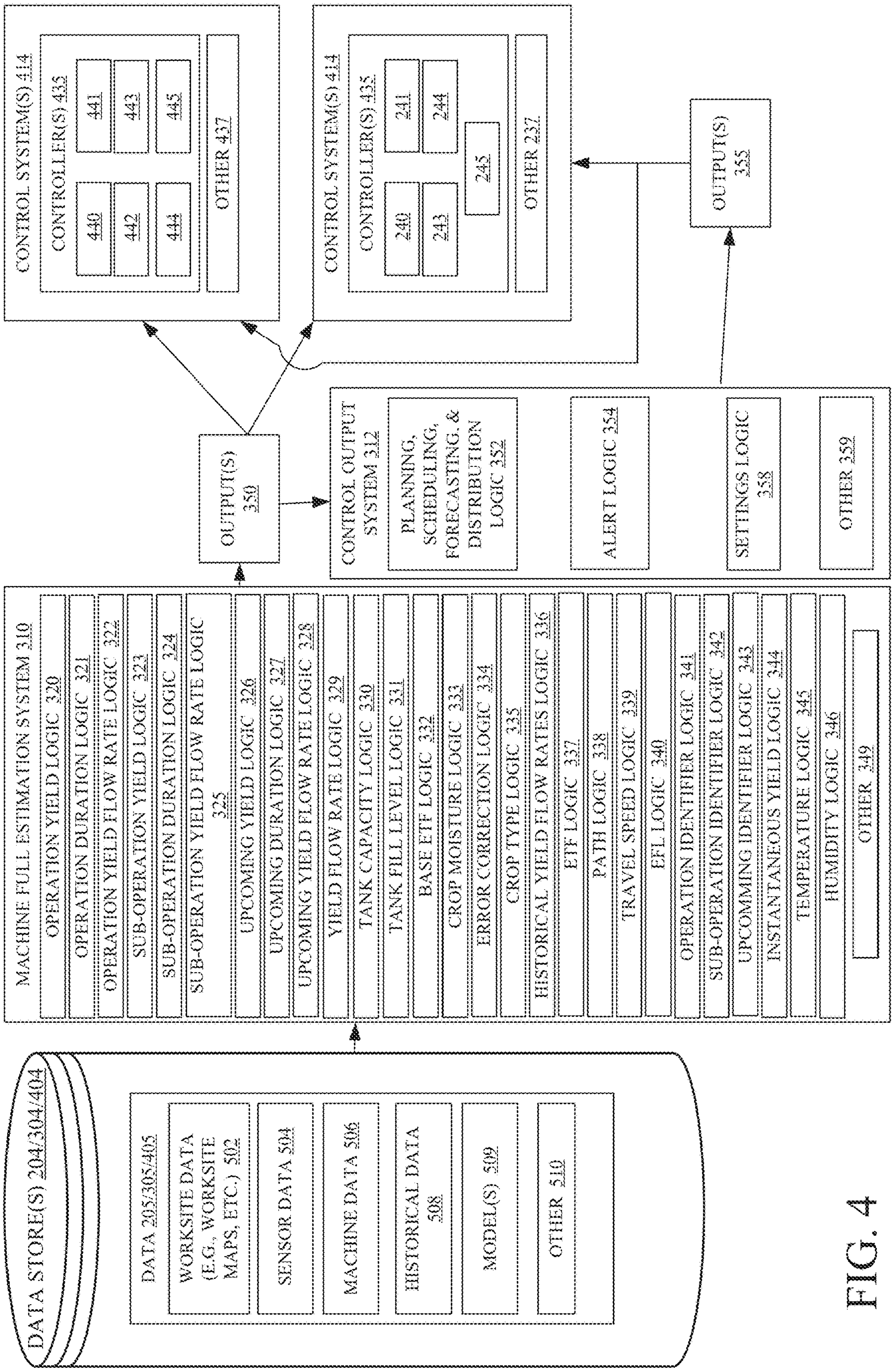
FIG. 4 is a block diagram showing some examples of components of the agricultural worksite operation system architecture in more detail.

FIG. 4 is a block diagram that shows examples of some of the components of agricultural worksite operation system architecture 300 in more detail and information flow between the components.

As illustrated in FIG. 4, it can be seen that data stores 204, data stores 304, data stores 404, or combination thereof, can include as data (205, 305, and 405, respectively), worksite data 502, sensor data 504, machine data 506, historical data 508, one or more models 509, and can include various other data 510, including, but not limited to, other data described elsewhere herein.

As shown in FIG. 4, machine full estimation system 310 includes operation yield logic 320, operation duration logic 321, operation yield flow rate logic 322, sub-operation yield logic 323, sub-operation duration logic 324, sub-operation yield flow rate logic 325, upcoming yield logic 326, upcoming duration logic 327, upcoming yield flow rate logic 328, yield flow rate logic 329, tank capacity logic 330, tank fill level logic 331, base estimated time until full (ETF) logic 332, crop moisture logic 333, error correction logic 334, crop type logic 335, historical yield flow rates logic 336, ETF logic 337, path logic 338, travel speed logic 339, estimated full location (EFL) logic 340, operation identifier logic 341, sub-operation identifier logic 342, upcoming identifier logic 343, instantaneous yield logic 344, temperature logic 345, humidity logic 346, and can include various other items 349 as well.

As shown in FIG. 3, controllers 435 can include one or more propulsion subsystem controllers 440, one or more path planning controllers 441, one or more actuator controllers 442, one or more interface controllers 443, communication system controller 444, and can include various other items 445, including various other controllers. Controllers 235 can include one or more propulsion subsystem controllers 240, one or more path planning controllers 241, one or more interface controllers 243, communication system controller 244, and can include various other items 245, including various other controllers.

As shown in FIG. 3, control output system 312 can include planning, scheduling, forecasting, and distribution logic 352, alert logic 354, settings logic 358, and can include various other items 359 as well.

As a general overview, machine full estimation system 310 is configured to generate one or more outputs 350, such as one or more of the metrics generated by each of its items, including, for example, one or more estimated time until full (ETF) metrics or one or more estimated full location (EFL) metrics, or both, based on data 205, data 305, or data 405, or a combination thereof (depending on how the data is distributed). The outputs 350 are provided to control system 214, control system 414, or to control output system 312, or a combination thereof. Control system 214 is operable to generate control signals to control one or more items of worksite operation system architecture 500 (e.g., one or more items of a material receiving machine 200, etc.) based on the one or more outputs 350. Control system 414 is operable to generate control signals to control one or more items of worksite operation system architecture 500 (e.g., one or more items of an agricultural harvester 100, etc.) based on the one or more outputs 350. Control output system 312 is operable to generate one or more outputs 355, such as one or more planning outputs, one or more scheduling outputs, one or more distribution outputs, one or more alert outputs, and one or more settings outputs. Outputs 355 can be provided to control system 214 which is operable to generate control signals to control one or more items of worksite operation system architecture 500 (e.g., one or more items of a receiving machine 200, etc.) based on the one or more outputs 355. Outputs 355 can be provided to control system 414 which is operable to generate control signals to control one or more items of agricultural worksite operation system architecture 300 (e.g., one or more items of an agricultural harvester 100, etc.) based on the one or more outputs 355.

Worksite data 502 includes data indictive of characteristics of one or more worksites (e.g., fields), which can include georeferenced worksite data such worksite maps. Such characteristics can include crop characteristics (e.g., crop type, crop moisture etc.), terrain characteristics (e.g., topography), soil characteristics, as well as various other worksite characteristics. In one example, worksite data 502 includes a map of a worksite (e.g., field) such as a vegetation index map (e.g., normalized difference vegetation index (NDVI) map, etc.) having vegetation index values across the worksite. In another example, worksite data 502 includes a predictive yield map having predictive yield values across the worksite. Worksite data 502 can also include worksite dimensions, including dimensions of sub-areas of the worksite. For instance, a worksite, such as a field, may have a general area (e.g., a field area) that is of a given dimension (e.g., 100 acres). The field may also have portions with given areas, such as a crop area (e.g., area where crop is located) of a given dimension (e.g., 95 acres) and a non-crop area (e.g., area where crop is not located, such as headlands) of a given dimension (e.g., 5 acres). Worksite data 502 can also include weather characteristic data for one or more worksites (e. g., fields) indicative of past or current weather characteristics, such as humidity, temperature, wind speed and direction, precipitation (e.g., type and accumulated amount, etc.), as well as various other weather characteristics. Worksite data 502 can include various other data indicative of various other characteristics of the worksite.

Sensor data 504 includes data generated by sensors 208 and data generated by sensors 408, including heading and speed sensor data generated by heading/speed sensors 225, geographic position sensor data generated by geographic position sensors 203, various other sensor data generated by various other sensors 228, conveying mechanism sensor data generated by conveying mechanism sensors 422, weather sensor data generated by weather sensors 423, mass flow sensor data generated by mass flow sensors 424, heading and speed sensor data generated by heading/speed sensors 425, fill level sensor data generated by fill level sensors 426, grain moisture sensor data generated by grain moisture sensors 427, geographic position sensor data generated by geographic position sensors 403, as well as various other sensor data generated by various other sensors 428. Sensor data 504 can be historical sensor data generated in one or more prior operations as well as current sensor data generated during one or more current operations.

Machine data 506 includes various data indicative of characteristics of agricultural harvesters 100 and receiving machines 200, such as machine ID, machine type, machine dimensions (e. g., width, length, height, etc.) including dimensions of components of the machines (e. g., width of header 104 of agricultural harvesters 100, tank dimensions (e. g., capacity) of grain tank 132 of agricultural harvesters 100, material receptacle dimensions (e. g., capacity) of material receptacle of receiving machines 200, etc.), machine configuration, as well as various other data indicative of various other machine characteristics. Machine data 506 can also include various data indicative of planned operation parameters of agricultural harvesters 100 and receiving machines 200, such as planned machine settings (e. g., planned machine travel speeds, etc.), planned machine routes, set or planned (e.g., threshold) fill levels, as well as various other planned operation parameters. Machine data 506 can include various other data relative to agricultural harvesters 100 and receiving machines 200.

Historical data 508 includes various historical data relative to historical operations, such as historical metrics output by machine full estimation system 310 for prior operations, at the same worksite or at different worksites, or both, including, but not limited to, historical ETF metrics, and historical yield flow rate metrics.

Models 509 can include various models, including estimated time until full (ETF) models configured to receive one or more inputs and provide, as a model output, an ETF metric. In one example, a model 509 can be one of a variety of different artificial intelligence (e.g., machine learning (or machine learned), etc.) models. The model 509 can be a linear machine learning model or a non-linear machine learning model. In one example, the model 509 is a decision tree, such as a gradient boosting decision tree, such as an extreme gradient boosting decision tree. Other types of artificial intelligence (e.g., machine learning, etc.) models are contemplated herein. In one example, a model 509 is configured to receive, as model inputs, a base ETF metric, a crop moisture metric (e.g., average crop moisture metric), a crop type metric (e.g., indicative a crop type corresponding to an operation), an error correction metric, a temperature metric, a humidity metric, and optionally one or more historical yield flow rate metrics, and is configured to generate, as a model output, an ETF metric.

Figure 5A:
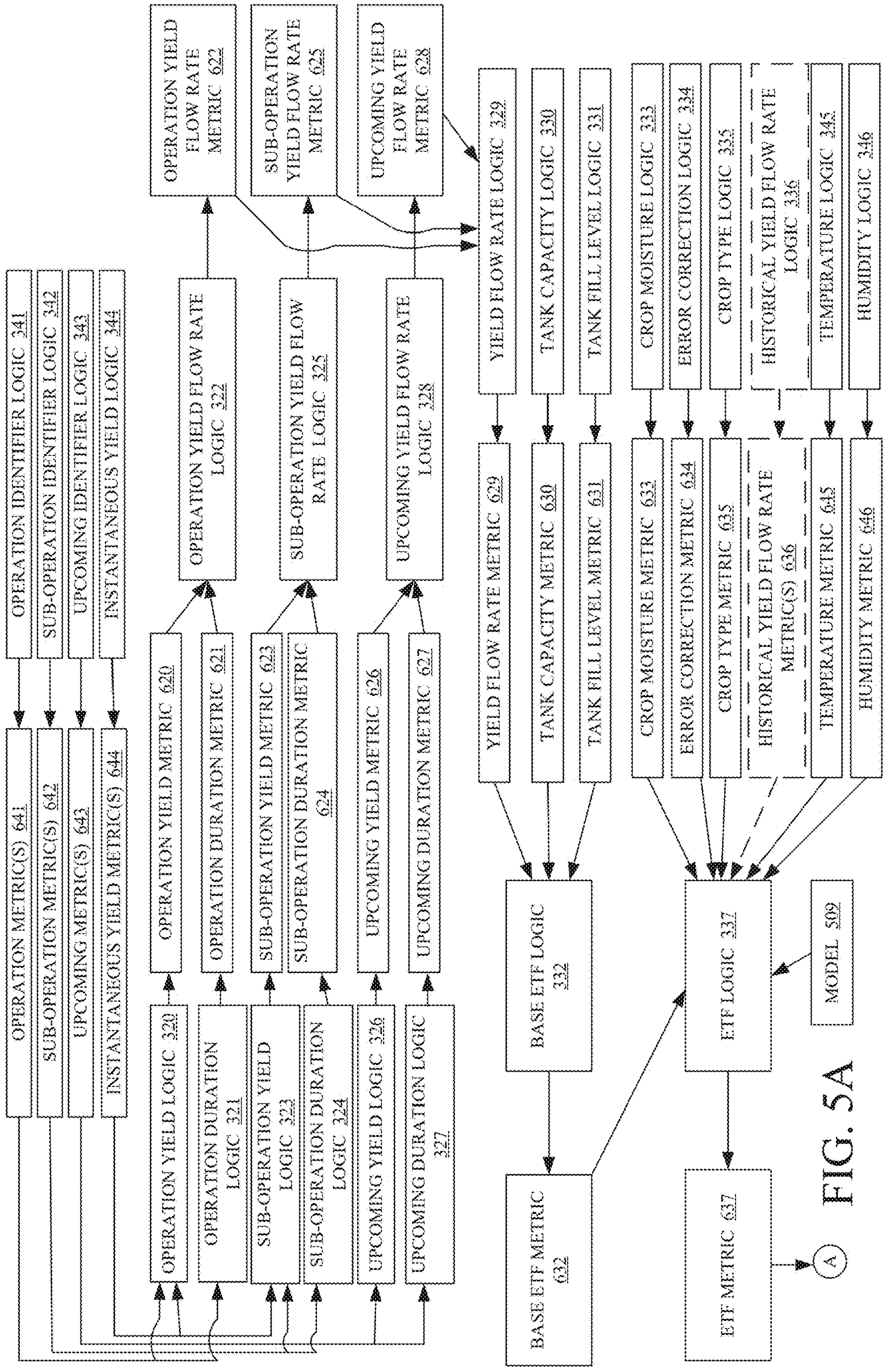
FIG. 5A is a block diagram showing some examples of components of the agricultural worksite operation system architecture in more detail.
Figure 5B:
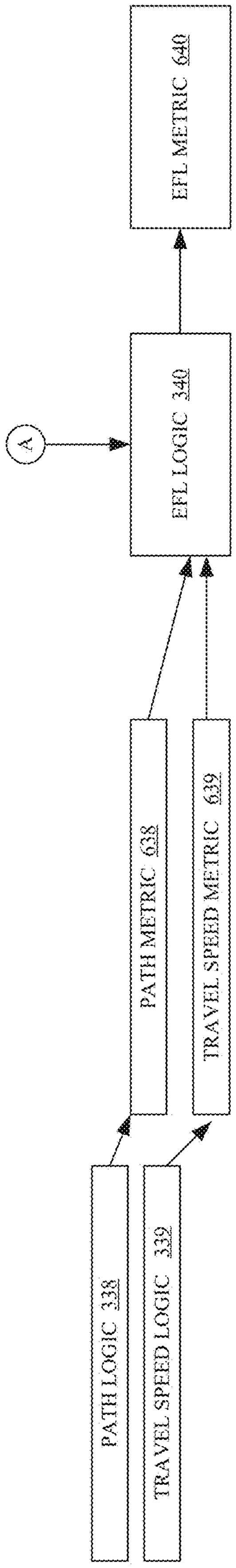
FIG. 5B is a block diagram showing some examples of components of the agricultural worksite operation system architecture in more detail.

Discussion will now proceed to FIG. 5A-B. FIGS. 5A-5B (collectively referred to herein as FIG. 5) are a block diagram showing some components of worksite operation system architecture 300 in more detail and information flow among the components.

Sub-operation identifier logic 342 generates sub-operation metrics 642 identifying sub-operations during the course of a worksite operation, including the start and end of each sub-operation and thus, the duration of each sub-operation. A sub-operation, as used herein, refers to a cycle in which agricultural harvester 100 is filled and emptied. An operation can consist of multiple sub-operations. The beginning of a sub-operation (e. g., the first sub-operation) may be when harvest is initiated, which may be detected based upon the first sensor data from mass flow sensors 424 and the end of a sub-operation (e.g., the first sub-operation) may be detected based upon sensor data from conveying mechanism sensors 422 (e.g., sensor data indicating that the conveying mechanism 134 is no longer conveying material (e.g., conveying mechanism is shut down, etc.) after receiving sensor data indicating that conveying mechanism 134 began conveying material (e. g., conveying mechanism was turned on)). The beginning of a sub-operation (e. g., a subsequent sub-operation after a previous sub-operation) may be when a previous sub-operation is ended, which may be detected, as previously discussed, based on sensor data conveying mechanism sensors 422 and the end of a sub-operation (e. g., a subsequent sub-operation after a previous sub-operation) may be when the conveying mechanism 134 is again turned off after being again turned on, which may be detected based upon sensor data from conveying mechanism sensors 422. The sensor data may be timestamped or machine full estimation system 310 may include, as part of other 349, a real time clock component that outputs a time (and perhaps a date), or both.

Operation identifier logic 341 generates operation metrics 641 identifying a current operation and a duration of the current operation, which includes identifying a start of the operation which may be detected in the same way as detecting the beginning of the first sub-operation, as discussed above, and identifying a time. The time may be a current time which may be detected based upon timestamped sensor data or may be detected based upon an output of a real time clock component, as part of other 349. A time may be the end of the most-recent sub-operation which may be detected in the same way as detecting the end of a sub-operation, as discussed above.

It will be understood that in some examples, the duration of the sub-operation or the operation, or both, will take into account inactive harvesting time. For instance, there may be times during an operation and sub-operation when the harvester 100 is not actively harvesting (e.g., the implement, such as the header 104, is not engaged), such as during a headland turn. Thus, an overall duration of an operation and an overall duration of a sub-operation may each consist of an active time (e.g., active harvesting time) and an inactive time (e.g., inactive harvesting time). This inactive time can be calculated and taken out of the overall duration to identify, as the duration of the sub-operation (sub-operation duration metric) or the duration of the operation (operation duration metric), or both, only the time during which the harvester 100 is engaged in active harvesting. Various sensors (e.g., 428) on the harvester 100 can be used to determine when the implement (e.g., header 104) is engaged, such as a sensor configured to detect the movement, or a characteristic of movement (e.g., speed), of a crop engaging component of the implement (e.g., header 104) or movement, or a characteristic of movement (e.g., speed), of a component (e.g., shaft, motor, etc.) used to drive one or more crop engaging components of the implement (e.g., header 104).

Upcoming identifier logic 343 generates upcoming metrics 643 identifying upcoming areas of the field to be traveled by an agricultural harvester 100. Upcoming identifier logic 343 can identify the upcoming areas of the worksite (e.g., field) to be traveled by agricultural harvester 100 based upon planned route data (e.g., from machine data 506) or heading sensor data from heading/speed sensors 425 and based upon a map of the worksite (e.g., from worksite data 502).

Instantaneous yield logic 344 identifies instantaneous yield metrics (values) 644 during the course of an operation. Yield is generally represented by a value in bushels per acre. Yield is calculated based upon mass flow sensor data generated by mass flow sensors 224, as well as travel speed sensor data generated by heading/speed sensors 425, and a header width metric (indicative of a width of header 104) obtained from machine data 506. The travel speed and header width are used, by instantaneous yield logic 344 to identify an area covered (acreage) by agricultural harvester. Mass flow is generally represented by a value in weight (e.g., kilograms, etc.) per unit time (e.g., seconds). A mass flow value can thus be converted to a yield value by using a preset weight unit (e.g., kilograms, etc.) for a bushel, which may vary depending on the crop being harvested. For example, for corn, a preset bushel value may be 56 pounds (or 25.4012 kilograms). Thus, based upon mass flow sensor data, travel speed sensor data, and a header width metric, instantaneous yield logic 344 can generate a plurality of instantaneous yield metrics (values) 644 during the course of an operation (e.g., an instantaneous yield value for each reading from mass flow sensors 524 or some other interval).

As shown in FIG. 5, operation yield logic 320 generates an operation yield metric 620. Operation yield metric 620 is indicative of a total amount of yield (e.g., total amount of bushels) over the course of a current operation. Operation yield logic 320 generates operation yield metric 620 by aggregating a plurality of instantaneous yield metrics 644 generated by instantaneous yield logic 344 over the course of the current operation, the course of the current operation can be indicated by an operation metric 641.

Operation duration logic 321 generates an operation duration metric 621 indicative of a duration of a current operation, based upon an operation metric 641 generated by operation identifier logic 341. As previously discussed, the operation duration metric 621 may indicate, as the duration of the operation, the duration of the operation during which an implement (e.g., header 104) is engaged (e.g., when the harvester 100 is in engaged in active harvesting).

Operation yield flow rate logic 322 generates an operation yield flow rate metric 622 indicative of a yield flow rate (e.g., bushels per unit time) during the course of the current operation. Operation yield flow rate logic 322 generates the operation yield flow rate metric 622 based upon the operation yield metric 620 and the operation duration metric 621. In one example, the operation yield flow rate metric 622 is the quotient of the operation yield metric 620 divided by the operation duration metric 621. Thus, in one example, operation yield flow rate logic 322, to generate the operation yield flow rate metric 622, divides the operation yield metric 620 (the dividend) by the operation duration metric 621 (the divisor).

Sub-operation yield logic 323 generates a sub-operation yield metric 623. Sub-operation yield metric 620 is indicative of a total amount of yield (e.g., total amount of bushels) over the course of a current sub-operation. Sub-operation yield logic 323 generates sub-operation yield metric 623 by aggregating a plurality of instantaneous yield metrics 644 generated by instantaneous yield logic 344 over the course of the current sub-operation, the course of the current sub-operation can be indicated by a sub-operation metric 642.

Sub-Operation duration logic 324 generates a sub-operation duration metric 624 indicative of a duration of a current sub-operation, based upon a sub-operation metric 641 generated by operation identifier logic 341. As previously discussed, the sub-operation duration metric 641 may indicate, as the duration of the sub-operation, the duration of the sub-operation during which an implement (e.g., header 104) is engaged (e.g., when the harvester 100 is in engaged in active harvesting).

Sub-operation yield flow rate logic 325 generates a sub-operation yield flow rate metric 625 indicative of a yield flow rate (e.g., bushels per unit time) during the course of the current sub-operation. Sub-operation yield flow rate logic 325 generates the sub-operation yield flow rate metric 625 based upon the sub-operation yield metric 623 and the sub-operation duration metric 624. In one example, the sub-operation yield flow rate metric 625 is the quotient of the sub-operation yield metric 623 divided by the sub-operation duration metric 624. Thus, in one example, sub-operation yield flow rate logic 325, to generate the sub-operation yield flow rate metric 625, divides the sub-operation yield metric 623 (the dividend) by the sub-operation duration metric 624 (the divisor).

Upcoming yield logic 326 generates an operation yield metric 626. Operation yield metric 626 is indicative of a total amount of yield (e.g., total amount of bushels) over the course of the upcoming or remaining operation (e.g., the remainder of the field to be harvested by an agricultural harvester 100). Upcoming yield logic 326 generates upcoming yield metric 626 by aggregating a plurality of yield values derived from a map of the field (e.g., a predictive map of the field having predictive yield values) corresponding to the upcoming or remaining operation (e.g., corresponding to the remainder of the field to be harvested by an agricultural harvester), the upcoming or remaining operation (e.g., the remainder of the field to be harvested by an agricultural harvester) can be indicated by an upcoming metric 643.

In some examples, the map of the field (e.g., the predictive yield map of the field having predictive yield values) is generated in-situ (during the course of the operation) by upcoming yield logic 326. Yield logic 326 may generate the in-situ predictive yield map based upon an input map (e.g., vegetation index (e.g., NDVI) map) and based upon yield values detected during the operation (e.g., instantaneous yield metrics 644). Yield logic 326 may generate a model (e.g., linear regression, etc.) that identifies a relationship between yield and the characteristic in the input map (e.g., vegetation index (e.g., NDVI)). For instance, each detected yield value may correspond to a geographic location in the field (which can be derived based upon geographic position sensor data generated by geographic position sensors 304, machine speed sensor data generated by heading/speed sensors 425, as well, in some examples, a preset processing delay time indicative of a time between when the crop is engaged by the harvester 100 and when it is detected by mass flow sensors 424). For each detected yield value, there may be a corresponding (corresponding to the same geographic location) mapped characteristic value (value of characteristic in the map, such as vegetation index value (e.g., NDVI value)), which together, form a corresponding pair. A model (e.g., linear regression, etc.) can then be generated based upon a plurality of corresponding pairs of detected yield values and mapped characteristic values. The model can then be used to predict yield values at upcoming areas of the field (e.g., areas of the field ahead of the harvester 100 relative to a travel direction or route) by inputting the mapped characteristic value corresponding to each of those upcoming areas of the field, the model then outputting a predictive yield value at each of those upcoming areas of the field. As the harvester 100 continues to operate at the field, the model can continuously be updated (e.g., refined) based upon the additional corresponding pairs from the subsequent operation. The predictions can then also be updated. This is merely one example. A predictive yield map may be generated or otherwise obtained in various other ways.

Upcoming duration logic 327 generates an upcoming duration metric 627 indicative of a duration of an upcoming or remaining operation (e.g., how long it will take agricultural harvester to finish the upcoming or remaining operation), based upon an upcoming metric 643 generated by operation identifier logic 341, machine route data (derived from machine data 506 or sensor data 504 such as heading sensor data generated by heading/speed sensors 425), and machine travel speed data (derived from machine data 506 or sensor data 504 such as speed sensor data generated by heading/speed sensors 425).

Upcoming yield flow rate logic 328 generates an upcoming yield flow rate metric 628 indicative of a yield flow rate (e.g., bushels per unit time) during the course of an upcoming operation. Upcoming yield flow rate logic 328 generates the upcoming yield flow rate metric 628 based upon the upcoming yield metric 626 and the upcoming duration metric 627. In one example, the upcoming yield flow rate metric 628 is the quotient of the upcoming yield metric 626 divided by the upcoming duration metric 627. Thus, in one example, upcoming yield flow rate logic 328, to generate the upcoming yield flow rate metric 628, divides the upcoming yield metric 626 (the dividend) by the upcoming duration metric 627 (the divisor).

Yield flow rate logic 329 generates a yield flow rate metric indicative of a predicted (or expected) yield flow rate (e.g., bushels per unit time). Yield flow rate logic 329 generates the upcoming yield flow rate metric 629 based upon operation yield flow rate metric 622, the sub-operation yield flow rate metric 625, and the upcoming flow rate metric 628. In one example, the yield flow rate metric 629 is the result of aggregation of the operation yield flow rate metric 622, the sub-operation yield flow rate metric 625, and the upcoming flow rate metric 628. The aggregation may comprise weighted averaging of the operation yield flow rate metric 622, the sub-operation yield flow rate metric 625, and the upcoming flow rate metric 628. The weight for each metric may depend on how far along the agricultural harvester 100 is in a current operation. For instance, the upcoming yield flow rate metric 628 may be weighted more at the beginning of an operation and weighted lower further along in the operation. Sub-operation yield flow rate metric 625 may be weighted more than operation yield flow rate metric 622 at the beginning of an operation, but operation yield flow rate metric 622 may be weighted higher than sub-operation yield flow rate metric 625 later on in the operation. The timing indicating how far along the agricultural harvester 100 is in a current operation is indicated by an operation metric 641. These are merely some examples of the weighting. It will be understood that the weight of the metrics may all be the same, may all be different, or two may be the same and one may be different.

Tank capacity logic 330 generates a tank capacity metric 630 indicative of a capacity of the on-board grain tank 134 of an agricultural harvester 100. Tank capacity logic 330 can generate the tank capacity metric 630 based on machine data 506.

Tank fill level logic 331 generates a tank fill level metric 631 indicative of a fill level of the on-board grain tank 134 of an agricultural harvester 100. Tank fill level logic 331 can generate the tank fill level metric 631 based on sensor data 504 (e.g., based upon mass flow sensor data generated by mass flow sensors 424) or based on a sub-operation yield metric 623.

Base ETF logic 352 generates a base ETF metric 632 indicative of a base predicted estimated time until full (ETF) (e. g., a predicted time until the agricultural harvester will be full, at least to a threshold level). Base ETF logic 352 generates the base ETF metric 632 based on the yield flow rate metric 629, the tank capacity metric 630, and the tank fill level metric 631.

In some examples, base ETF logic 632 aggregates the tank capacity metric 630 and the tank fill level metric 631 (e. g., subtracts the tank fill level metric 631 from the tank capacity metric 630) to identify a remaining tank capacity of the on-board grain tank 134 of an agricultural harvester 100. Additionally, in identifying the remaining tank capacity of the on-board grain tank 134, base ETF logic 352 may account for a threshold fill level (e.g., it may be that the operator or another user does not want the on-board grain tank 134 completely filled). The threshold fill level can be derived from machine data 506. In such examples, base ETF may identify an adjusted tank capacity metric based upon the tank capacity metric 630 and the threshold fill level and aggregate the adjusted tank capacity metric and the tank fill level metric 631 (e. g., subtract the tank fill level metric 631 from the adjusted tank capacity metric) to identify an adjusted remaining capacity. In either case, the remaining tank capacity or the adjusted remaining tank capacity is used, along with the yield flow rate metric 629, to generate a base ETF metric 632. For example, where the yield flow rate metric 629 is 1 bushel per second and the remaining tank capacity (adjusted or unadjusted) is 100 bushels, then base ETF logic 332 generates a base ETF metric of 100 seconds.

As shown in FIG. 5, crop moisture logic 333 generates a crop moisture metric 633 indicative of moisture of crop (e.g., grain). The crop moisture metric 633 may be an aggregation (e.g., average) of crop (e.g., grain) moisture values derived from sensor data 504 (e.g., grain moisture sensor data generated by grain moisture sensors 427) or an aggregation (e.g., average) of crop (grain) moisture values from a map of the worksite (e.g., a crop (e.g., grain) moisture map of the worksite) in worksite data 502. The crop moisture metric 633 may be an aggregation (e.g., average) of crop (e.g., grain) moisture values corresponding to the current sub-operation, whether derived from sensor data 504 or derived from worksite data 502.

Error correction logic 334 generates an error correction metric 634 indicative of an error in a tank fill level metric 631. In some examples, a tank fill level metric 631 has some error. When the tank fill level is detected by fill level sensors 426, a comparison between the tank fill level detected by fill level sensors 426 and the tank fill level metric 631 can be executed to determine a difference, and that difference comprises, or is used to derive, the error correction metric 634. For example, a fill level sensor 426 may be placed to detect at a particular location in the tank and will detect when the grain reaches that location (and thus has filled the tank to that level. For instance, a fill level sensor 426 may be placed to detect at a location representing a 75% fill level. The tank fill level metric 631 (at the time the fill level sensor 426 detects 75% fill level) may indicate that the fill level is different than 75% (e. g., more or less than 75%). The difference comprises, or is otherwise used to derive, the error correction metric 634 (e.g., the error metric 634, in some examples, may not be the difference, but a proportion of the difference). Because machine full estimation system 310 is generating an ETF metric for a current sub-operation and the error correction for the current sub-operation may not yet be known, the error correction metric 634 will the error correction of a previous sub-operation (e.g., the most recent previous sub-operation) or an aggregation (e.g., average) of each error correction for a plurality of previous sub-operations. When the error correction for the current sub-operation is known, that error correction may be used as the error correction metric 634.

Crop type logic 335 generates a crop type metric 635 indicative of a crop type, and, in some examples, a further sub-type, of crop at the worksite. The crop type, and, in some examples, the further sub-type, may be represented by an arbitrary metric in the form of a number (or other value), for instance, corn may be represented by a crop type metric 635 such as the number “1” or the letter “C”, for instance. In another example, corn, and more specifically, corn of a given variety (e.g., hybrid), may be represented by a crop type metric 635 such as "1-2" or "C-Z" or "1-C" or some other combination of values, where one value, in the combination of values, represents the type (e.g., species, such as corn) and where the other value, in the combination of values, represents the sub-type (e.g., variety, such as hybrid of the corn). Crop type logic 335 can generate a crop type metric 635 based on worksite data 502. Where the worksite has multiple crop types, the crop type metric 635 will be a crop type metric representing crop corresponding to the current sub-operation.

Optionally, historical yield flow rate logic 336 generates one or more historical yield flow rate metrics 636 based on historical yield flow rates at the worksite (or another worksite, such as a similarly situated worksite) in previous operations, and more particularly, previous operations harvesting a same (or at least similar (e.g., the same species by the sub-species may differ) crop type. In one example, each historical yield flow rate may be utilized individually thus resulting in a plurality of historical yield flow rate metrics 636. In another example, each historical yield metric may be aggregated (e.g., averaged) to generate a historical yield flow rate metric 636. The historical yield flow rates may be derived from historical data 508.

Temperature logic 345 generates a temperature metric 645 indicative of an ambient temperature at the worksite. Temperature logic 345 generates the temperature metric 645 based on sensor data 504 (e.g., temperature sensor data generated by weather sensors 423) or based on temperature data derived from worksite data 502. In one example, the temperature metric 645 comprises an average ambient temperature at the worksite during the corresponding sub-operation, in which case, temperature logic 345 may aggregate temperature sensor readings by weather sensors 423 taken during the current sub-operation, as derived from sensor data 504.

Humidity logic 346 generates a humidity metric 646 indicative of an ambient humidity at the worksite. Humidity logic 346 generates the humidity metric 646 based on sensor data 504 (e.g., humidity sensor data generated by weather sensors 423) or based on humidity data derived from worksite data 502. In one example, the humidity metric 646 comprises an average ambient humidity at the worksite during the corresponding sub-operation, in which case, humidity logic 346 may aggregate humidity sensor readings by weather sensors 423 taken during the current sub-operation, as derived from sensor data 504.

As shown in FIG. 5, ETF logic 337 generates an ETF metric 637 indicative of an estimated time until and agricultural harvester will be full (ETF) in a current operation (e.g., in a current sub-operation of the current operation). In one example, ETF logic 337 generates an ETF metric 637 based on a model 509, a base ETF metric 632, a crop moisture metric 633, an error correction metric 634, a crop type metric 635, a temperature metric 645, and a humidity metric 646. In one example, ETF logic 337 generates an ETF metric 637 based on a model 509, a base ETF metric 632, a crop moisture metric 633, an error correction metric 634, a crop type metric 635, a historical yield flow rate metric 636, a temperature metric 645, and a humidity metric 646.

As previously discussed, a model 509 can be one of a variety of different types of models, such as one of variety of different types of artificial intelligence (e.g., machine learning (or machine learned), etc.) models. A model 509 can be a linear machine learning model or a non-linear machine learning model. In one example, the model 509 is a decision tree, such as a gradient boosting decision tree, such as an extreme gradient boosting decision tree. Other types of artificial intelligence (e.g., machine learning, etc.) and artificial intelligence (e.g., machine learning, etc.) models are contemplated herein.

In one example, the model 509 is configured to receive, as model inputs, a base ETF metric 632, a crop moisture metric 633, an error correction metric 634, a crop type metric 635, a temperature metric 645, and a humidity metric 646, and to generate, as a model output, an ETF metric 637.

In one example, the model is configured to receive, as model inputs, a base ETF metric 632, a crop moisture metric 633, an error correction metric 634, a crop type metric 635, a temperature metric 645, a humidity metric 646, and one or more historical yield flow rate metrics 636, and to generate, as a model output, an ETF metric 637.

As illustrated in FIG. 5, path logic 338 generate a path metric 638 indicative of an upcoming travel path of an agricultural harvester 100. Path logic 338 can generate the path metric 638 based on sensor data 504 (e.g., heading sensor data generated by heading/speed sensors 425) or based on machine data 506 (e.g., planned travel path or route data).

Travel speed logic 339 generates a travel speed metric 639 indicative of a predicted travel speed of the agricultural harvester 100 along the upcoming travel path (indicated by path metric 638). Travel speed logic 339 can generate the travel speed metric 638 based on sensor data 504 (e.g., speed sensor data generated by heading/speed sensors 425) or based on machine data 506 (e.g., planned travel speed data).

EFL logic 340 generates an EFL metric 640 indicative of an estimated location at the worksite (along the upcoming travel path of the agricultural harvester 100) at which the agricultural harvester 100 will be full based on the ETF metric 637, the path metric 638, and the travel speed metric 639.

Discussion returns to FIG. 4 where it can be seen the machine full estimation system 310 provides one or more outputs 350 which may include one or more of each one of the metrics 620 through 646 shown in FIG. 5.

The one or more outputs 350 may be provided to one or more control systems 414 to control one or more agricultural harvesters 100 or other components of worksite operation system architecture 500. For example, propulsion subsystem controllers 440 can generated control signals to control propulsion subsystem 450 to control a travel speed of an agricultural harvester 100 based on the one or more outputs 350 (e.g., based on an ETF metric 637 or based on an EFL metric 640, or both). Additionally, or alternatively, path planning controllers 441 can generate control signals to control steering subsystem 452 to control a heading of an agricultural harvester 100 based on the one or more outputs 350 (e.g., based on an ETF metric 637 or based on an EFL metric 640, or both). Additionally, or alternatively, actuator controllers 442 can generate control signals to control actuators 454 to control one or more operating characteristics (e.g., settings) of an agricultural harvester 100 based the one or more outputs 350 (e.g., based on an ETF metric 637 or based on an EFL metric 640, or both). Additionally, or alternatively, interface controllers 443 can generate control signals to control one or more interface mechanisms (e.g., 418 or 364) to generate an indication (e.g., generate a display, etc.) based on the one or more outputs 350 (e.g., based on an ETF metric 637 or based on an EFL metric 640, or both). Alternatively, or additionally, communication system controller 444 can generate control signals to control communication system 406 to communicate the one or more outputs 350 (or data thereof) with other items of an agricultural harvester 100 or with other items of worksite operation system architecture 500 based on the one or more outputs 350 (e.g., based on an ETF metric 637 or based on an EFL metric 640, or both). These are merely some examples.

The one or more outputs 350 may be provided to one or more control systems 214 to control one or more material receiving machines 200 or other components of worksite operation system architecture 500. For example, propulsion subsystem controllers 240 can generated control signals to control propulsion subsystem 250 to control a travel speed of a material receiving machine based on the one or more outputs 350 (e.g., based on an ETF metric 637 or based on an EFL metric 640, or both). Additionally, or alternatively, path planning controllers 241 can generate control signals to control steering subsystem 252 to control a heading of a material receiving machine 200 based on the one or more outputs 350 (e.g., based on an ETF metric 637 or based on an EFL metric 640, or both). Additionally, or alternatively, interface controllers 243 can generate control signals to control one or more interface mechanisms (e.g., 218 or 364) to generate an indication (e.g., generate a display, etc.) based on the one or more outputs 350 (e.g., based on an ETF metric 637 or based on an EFL metric 640, or both). Alternatively, or additionally, communication system controller 244 can generate control signals to control communication system 206 to communicate the one or more outputs 350 (or data thereof) with other items of a material receiving machine 200 or with other items of worksite operation system architecture 500 based on the one or more outputs 350 (e.g., based on an ETF metric 637 or based on an EFL metric 640, or both). These are merely some examples.

The one or more outputs 350 may be provided to control output system 312. Control output system 312 may generate one or more outputs 355 based on the one or more outputs 350 (e.g., based on an ETF metric 637 or based on an EFL metric 640, or both). For example, planning, scheduling, forecasting, and distribution logic 352 may set or adjust the plan for conducting the operations, scheduling of operations, forecasting (such as forecasting a total workload for an agricultural harvester 100 or for a material receiving machine 200 or forecasting a total workload across a plurality of machines (e.g., one or more agricultural harvesters 100 or one or more material receiving machines 200, or both), or distribution of machines based on the one or more outputs 350 (e.g., based on an ETF metric 637 or based on an EFL metric 640, or both) and provide such as an output 355. It will be understood that outputs provided by planning, scheduling, forecasting, and distribution logic 352 can include one or more routes for each of one or more receiving machines 200 as well as a schedule for each of one or more receiving machines 200 (e.g., a route and schedule for rendezvousing with an agricultural harvester 100 to conduct a material transfer operation). It will be that planning, scheduling, forecasting, and distribution logic 352 can determine a location at the field to begin a material transfer operation and a location to end the material transfer operation based on the one or more outputs 350 (e.g., based on an ETF metric 637 or based on an EFL metric 640, or both). Planning, scheduling, forecasting, and distribution logic 352 can generate, as an output 355, the determined location(s) at the field to begin the material transfer operation.

Additionally, or alternatively, alert logic 354 may generate, as output(s) 355, one or more alerts which can be indicated (e.g., displayed) by one or more interface mechanisms (e. g., 218, 418, 364, etc.). For example, alert logic 354 may compare an ETF metric 637 to a corresponding threshold, and an alert can be generated and provided (e.g., displayed, etc.) to an operator 360 or user 364, or both, based thereon. For example, there may be a preset threshold (e.g., a threshold amount of time) and when the ETF metric 637 is at or below that preset threshold, an alert may be generated and provided (e.g., displayed, etc.) to an operator 360 or user 364, or both. Additionally, or alternatively, settings logic 358 may set or adjust settings (e.g., travel speed, heading or route, etc.) for an agricultural harvester 100 or for a material receiving machine 200, or both, based on the one or more outputs 650 (e.g., based on an ETF metric 637 or based on an EFL metric 640, or both) and provide such as an output 355.

The one or more outputs 355 may be provided to one or more control systems 414 to control one or more agricultural harvesters 100 or other components of worksite operation system architecture 500. For example, propulsion subsystem controllers 440 can generate control signals to control propulsion subsystem 450 to control a travel speed of an agricultural harvester 100 based on the one or more outputs 355. Additionally, or alternatively, path planning controllers 441 can generate control signals to control steering subsystem 452 to control a heading of an agricultural harvester 100 based on the one or more outputs 355. Additionally, or alternatively, actuator controllers 442 can generate control signals to control actuators 454 to control one or more operating characteristics (e.g., settings) of an agricultural harvester 100 based the one or more outputs 355. Additionally, or alternatively, interface controllers 443 can generate control signals to control one or more interface mechanisms (e.g., 418 or 364) to generate an indication (e.g., generate a display, etc.) based on the one or more outputs 355. Alternatively, or additionally, communication system controller 444 can generate control signals to control communication system 406 to communicate the one or more outputs 355 (or data thereof) with other items of an agricultural harvester 100 or with other items of worksite operation system architecture 500 based on the one or more outputs 355. These are merely some examples.

The one or more outputs 355 may be provided to one or more control systems 214 to control one or more material receiving machines 200 or other components of worksite operation system architecture 500. For example, propulsion subsystem controllers 240 can generate control signals to control propulsion subsystem 250 to control a travel speed of a material receiving machine 200 based on the one or more outputs 355. Additionally, or alternatively, path planning controllers 241 can generate control signals to control steering subsystem 252 to control a heading of a material receiving machine 200 based on the one or more outputs 355. Additionally, or alternatively, interface controllers 243 can generate control signals to control one or more interface mechanisms (e.g., 218 or 364) to generate an indication (e.g., generate a display, etc.) based on the one or more outputs 355. Alternatively, or additionally, communication system controller 244 can generate control signals to control communication system 206 to communicate the one or more outputs 355 (or data thereof) with other items of a material receiving machine 200 or with other items of worksite operation system architecture 500 based on the one or more outputs 355. These are merely some examples.

Figure 6:
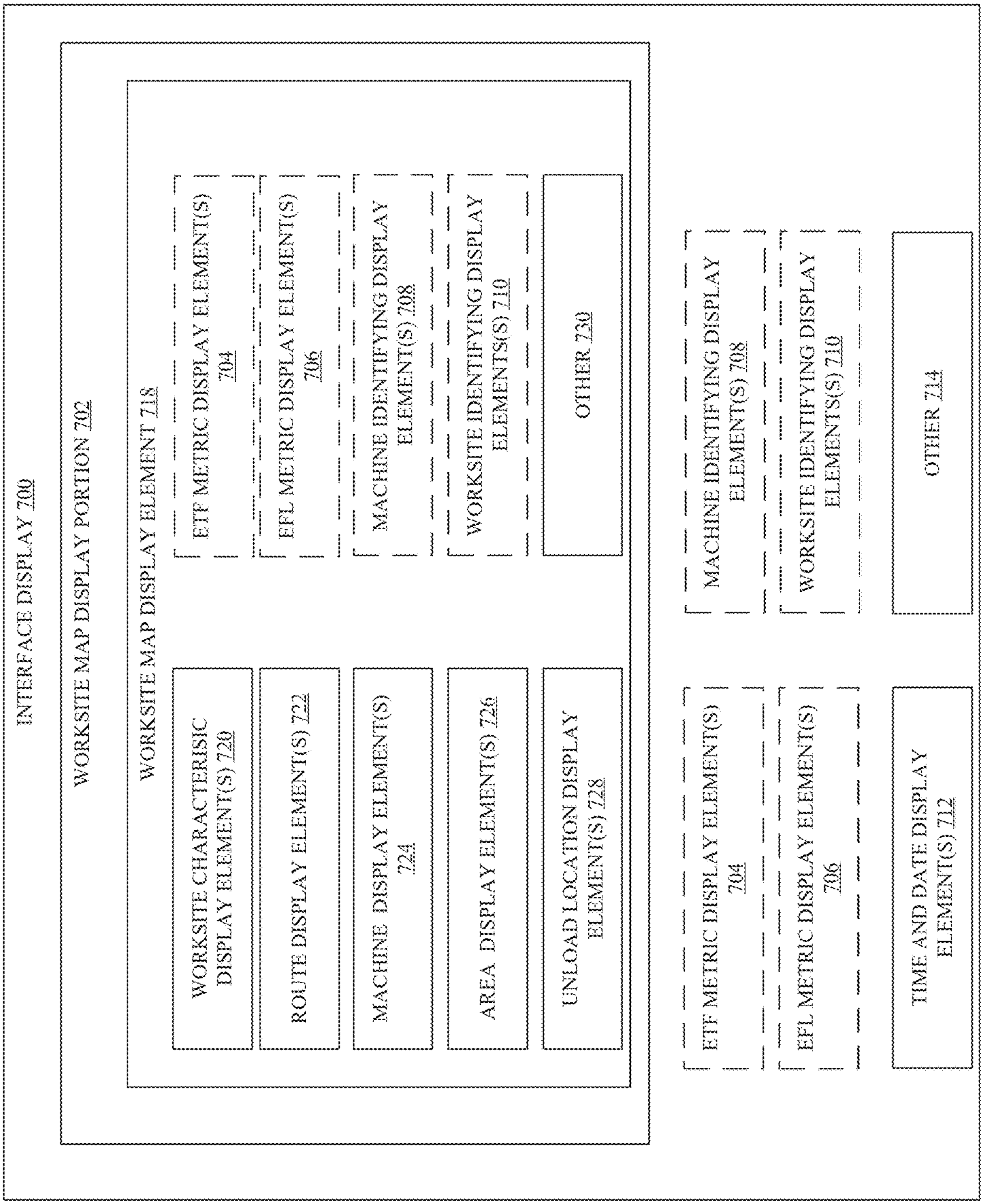
FIG. 6 is a block diagram showing one example interface displayable on an interface mechanism.

FIG. 6 is a block diagram showing one example interface display 700 that can be generated on a display screen of an interface mechanism (e.g., 218, 418, 364, etc.).

As illustrated, interface display 700 includes worksite map display portion 702, one or more ETF metric display elements 704, one or more EFL metric display elements 706, one or more machine identifying display elements 708, one or more worksite identifying display elements 710, time and date display elements 712, and can include various other items 714. Worksite map display portion 702 includes worksite map display element 718. Worksite map display element 718 includes one or more worksite characteristic display elements 720, one or more route display elements 722, one or more machine display elements 724, one or more area display elements 726, one or more unload location display elements 728, and can include other items 730 as well. As illustrated in FIG. 6, Worksite map display element 718 can also, or alternatively, include ETF metric display elements 704, EFL metric display elements 706, machine identifying display elements 708, or worksite identifying display elements 710, or a combination thereof.

Figure 7:
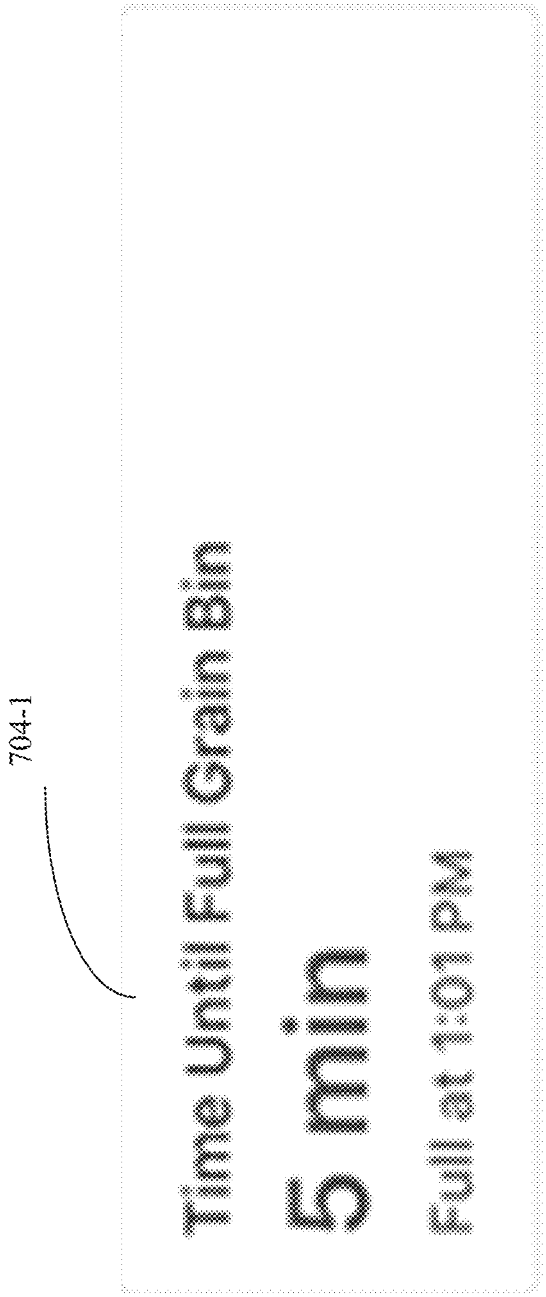
FIG. 7 is a pictorial illustration showing one example display element displayable on an interface mechanism.

ETF metric display elements 704 illustratively present, such as with letters, numbers, words, other characters, or a combination thereof, an ETF metric 637. One example ETF metric display elements is shown in FIG. 7. FIG. 7 is a pictorial illustration showing one example of ETF metric display elements 704 (illustratively shown as 704-1). As shown in FIG. 7, ETF metric display elements can include an amount of time until a harvester will be full (shown as "5 min" in FIG. 7), a clock time at which a harvester 100 will be full (shown as "Full at 1:01 PM" in FIG. 7), and a textual description that provides context to the display elements 704 (illustratively shown as "Time Until Full Grain Bin"). Conversation now returns to FIG. 6.

EFL metric display elements 706 illustratively present, such as with letters, numbers, words, other characters, or a combination thereof, an EFL metric 640. In examples in which the EFL metric display elements 706 are displayed as part of map display element 718, the EFL metric display elements 706 can additionally or alternatively present, such as with an icon (e.g., a dot, etc.), an EFL metric 640.

Machine identifying display elements 708 illustratively present, such as with letters, numbers, words, other characters, or a combination thereof, and, in some examples, with an icon of a machine (e.g., a harvester icon, etc.), information identifying the identity of the harvester 100 to which the ETF metric 637 and the EFL metric 640 correspond.

Worksite identifying display elements 710 illustratively present, such as with letters, numbers, words, other characters, or a combination thereof, and, in some examples, with an icon of a worksite (e.g., a worksite icon, which may be shaped like the worksite it corresponds to), information identifying the identity of the worksite to which the ETF metric 637 and the EFL metric 640 correspond.

Worksite map display element illustratively presents a map of a worksite.

Time and date display elements 712 illustratively present, such as with letters, numbers, words, other characters, or a combination thereof, information identifying a current time and current date.

Worksite characteristic display elements 720 illustratively present, such as with letters, numbers, words, other characters, or a combination thereof, and, in some examples, colors, symbols, patterns, etc., values of characteristics (e.g., yield values, etc.) at the worksite. The worksite characteristic display elements 720 can be displayed at locations on the worksite map display element 718 corresponding to the locations of the values of characteristics, that worksite characteristic display elements 720 represent, in the worksite.

Route display elements 722 illustratively present, such as with lines (e.g., colored lines), a route (including path already travelled and planned path which may be visually distinguished in various ways) of a corresponding machine, such as an agricultural harvester 100 or a material receiving machine 200. The route display elements 722 can be displayed at locations on the worksite map display element 718 corresponding to the locations of the routes, that route display elements 722 represent, in the worksite.

Machine display elements 724 illustratively present, such as with machine icons (e.g., agricultural harvester icons, material receiving machine icons, etc.) locations of machines, such as one or more agricultural harvesters 100 or one or more material receiving machines 200, or both. The machine display elements 724 are displayed at locations on the worksite map display element 718 corresponding to the locations of the machines, that machine display elements 724 represent, in the worksite.

Area display elements 726 illustratively present, such as with lines, boxes, colors, patterns, etc., locations of areas of the worksite (e.g., crop area 104 and non-crop area 106). The area display elements 726 are displayed at locations on the worksite map display element 718 corresponding to the locations of the areas of the worksite, that area display elements 726 represent, in the worksite.

Unload location display elements 728 illustratively present, such as with letters, numbers, words, other characters, or a combination thereof, and, in some examples, with an icon (e.g., a dot, etc.), unload locations output by control output system 312. The unload location display elements 728 are displayed at locations on the worksite map display element 718 corresponding to the locations of the unload locations, that unload location display elements 728 represent, in the worksite.

In examples Where map display element 718 includes ETF metric display elements 704 or EFL metric display elements 706, or both, the ETF metric display elements 704 may be displayed next to the machine display element 724 that represents the agricultural harvester 100 to which the ETF metric 737 and the EFL metric 740 correspond. For example, the ETF metric display elements 704 may be displayed as part of a text box or text bubble that is attached to the corresponding machine display element 722. The EFL metric display elements 706 are displayed at locations on the worksite map display element 718 corresponding to the locations of the EFL metrics 637, that EFL metric display elements 706, represent, in the worksite.

Figure 8:
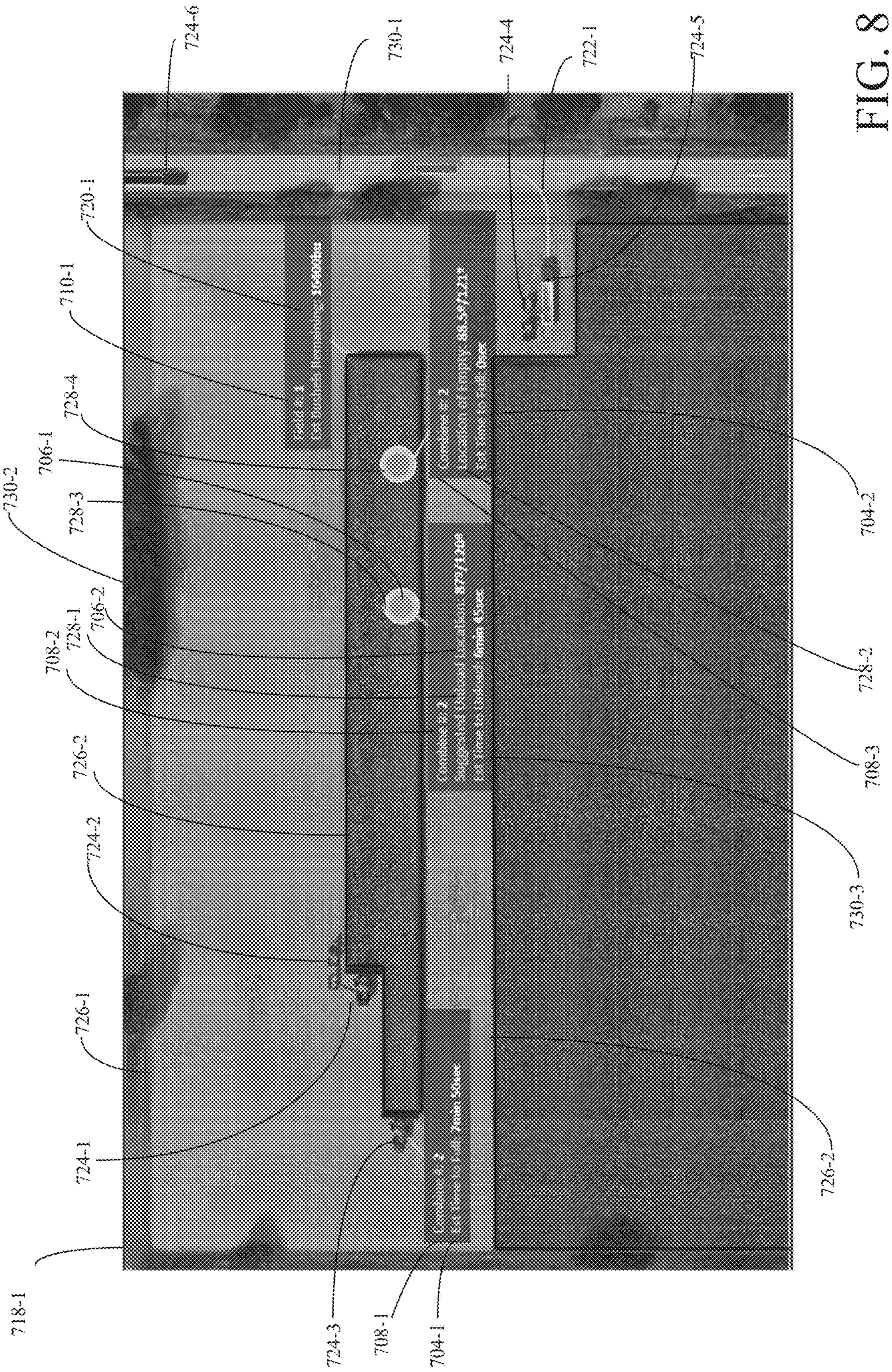
FIG. 8 is a pictorial illustration showing one example display element displayable on an interface mechanism.

FIG. 8 is a pictorial illustration showing one example worksite map display element 718 (illustratively shown as 718-1). As illustrated in FIG. 8, worksite map display element 718-1 includes example ETF metric display elements 704 (illustratively shown as 704-1 and 704-2), example EFL metric display elements 706 (illustratively shown as 706-1 and 706-2), example machine identifying display elements 708 (illustratively shown as 708-1, 708-2, and 708-3), example worksite identifying display elements 710 (illustratively shown as 710-1) example worksite characteristic display elements 720 (illustratively shown as 720-1), example route display elements 722 (illustratively shown as 722-1), example machine display elements 724 (illustratively shown as 724-1, 724-2, 724-3, 724-4, 724-5, and 724-6), example area display elements 726 (illustratively shown as 726-1 and 726-2), example unload location display elements 728 (illustratively shown as 728-1, 728-2, 728-3, and 728-4), and example other display elements 730 (illustratively shown as 730-1, 730-2, and 730-3).

ETF metric display element 704-1 presents an ETF metric 637 (illustratively shown as "7 min 50 sec"). ETF metric display element 704-2 presents an ETF metric 637 (illustratively shown as “0 sec” because it has not been calculated yet as the prior sub-operation is not yet complete).

EFL metric display element 706-1 presents an EFL metric 640 (illustratively shown as a dot presenting a corresponding location in the worksite at which the harvester 100 will be full). An unload location display element 728-3 (illustratively shown as a dot presenting a corresponding location in the worksite at which material transfer (i.e., unloading) should start) coincides with EFL metric display element 706-1 and is displayed at the same location. In some examples, the same display element (e.g., a dot) can be used as an EFL metric display element 706 and an unload location display element 728. EFL metric display element 706-2 presents an EFL metric 640 (illustratively shown as “87°/121°” presenting a geographic location at which the harvester will be full). An unload location display element 728-1 (illustratively shown as “Suggested Unload Location: 87°/121°” presenting a geographic location to begin unloading) coincides with EFL metric display element 706-2 and is displayed in the same place. An unload location display element 728-2 (illustratively shown as “Location of Empty: 88.5°/121°”) presents a geographic location at which unloading will or should end. An unload location display element 728-4 (illustratively shown as a dot) presents a geographic location at which unloading will or should end.

Machine identifying display element 708-1 (shown as “Combine #: 2”) presents identifying information of an agricultural harvester 100. Machine identifying display elements 708-2 and 708-3 are similar to machine identifying display element 708-1 but are displayed at different locations and are associated with other information.

Worksite identifying display element 710-1 (shown as “Field #: 1”) presents identifying information of a worksite.

Worksite characteristic display element 720-1 (shown as “Est Bushels Remaining: 16400 bu”) presents yield information of a worksite.

Route display element 722-1 (shown as a line and a semi-transparent machine icon) presents a route for a material receiving machine 200.

Machine display element 724-1 (shown as a harvester machine icon) presents a location of an agricultural harvester 100. Machine display element 724-2 (shown as a material receiving machine icon) presents a location of a material receiving machine. Machine display element 724-3 (shown as a harvester machine icon) presents a location of an agricultural harvester 100. Machine display element 724-4 (shown as a material receiving machine icon) presents a location of a material receiving machine. Machine display element 724-5 (shown as a material receiving machine icon) presents a location of a material receiving machine. Machine display element 724-6 (shown as a material receiving machine icon) presents a location of a material receiving machine.

Area display element 726-1 (shown as a colored bounding box) presents a location of an area of the worksite (a boundary defining where crop was planted). Area display element 726-2 (shown as a colored bounding box, of a different color than bounding box 726-1) bounds crop areas 104 and, in combination with area display element 726-1, also identifies non-crop areas 106 (e.g., areas already harvested).

Other display element 730-1 (shown as pictorial representation of a road) presents a location of a road. Other display element 730-2 (shown as a pictorial representation of one or more objects) presents locations of one or more objects (illustratively as trees). Other display element 730-3 (shown as “Est Time to Unload: 6 min 45 sec”) presents an estimated time that a material transfer operation will take to complete (as determined by control output system 312).

Figure 9A:
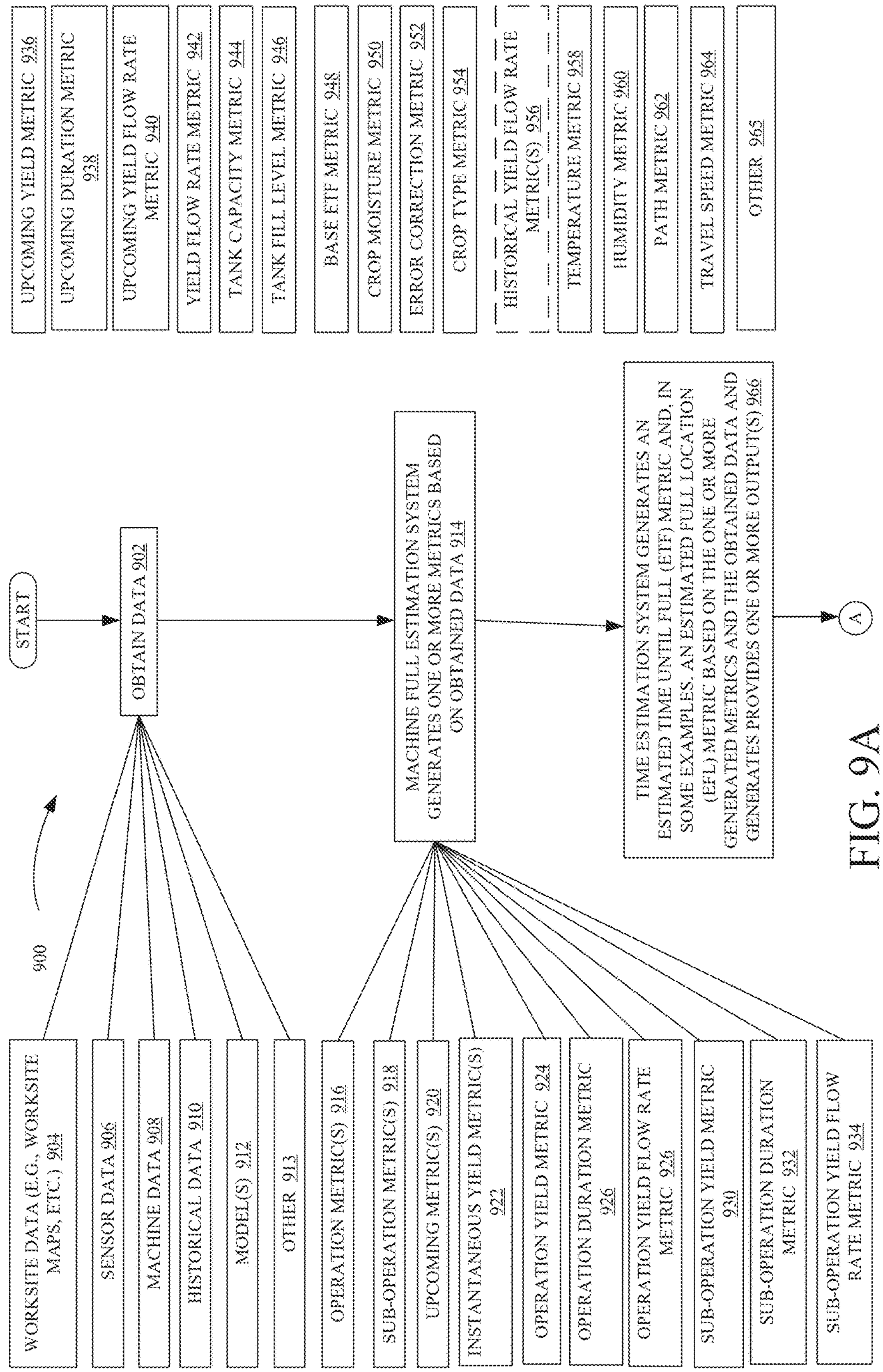
FIGS. 9A-9B (collectively referred to herein as FIG. 9) is a flow diagram showing one example operation of an agricultural worksite operation system architecture in generating an estimated time until full (ETF) metric and an estimated full location (EFL) metric.
Figure 9B:
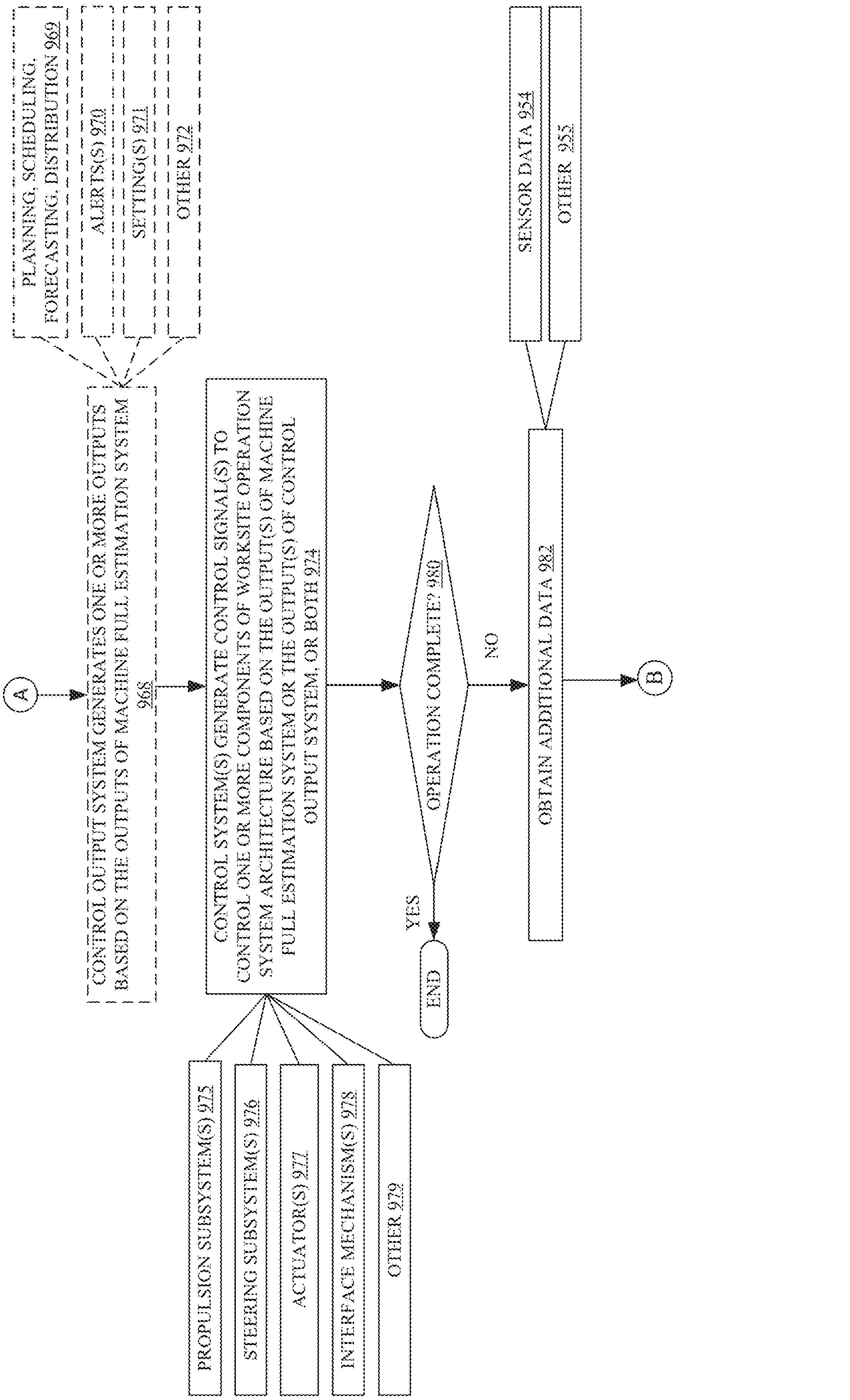

FIGS. 9A-9C (collectively referred to herein as FIG. 7) is a flow diagram showing one example operation 900 of a worksite operation system architecture 500 in generating an estimated time until full (ETF) and an estimated full location (EFL).

At block 902 various data is obtained (e.g., received, retrieved, generated, etc.). Some of the data at block 902 may be obtained prior to an operation being underway and some data may be obtained while the operation is underway. The obtained data can include worksite data 502 as indicated by block 904. The obtained data can include sensor data 504 as indicated by block 906. The obtained data can include machine data 506 as indicated by block 908. The obtained data can include historical data 508 as indicated by block 910. The obtained data can include one or more models 509 as indicated by block 912. The obtained data can include various other data (e.g., 510, etc.) as indicated by block 913.

At block 914, machine full estimation system 310 generates one or more metrics based on the data obtained at block 902. For example, operation identifier logic 341 can generate one or more operation metrics 641, as indicated by block 916. Sub-operation identifier logic 342 can generate one or more sub-operation metrics 642, as indicated by block 918. Upcoming identifier logic 343 can generate one or more upcoming metrics 643, as indicated by block 920. Instantaneous yield logic 344 can generate one or more instantaneous yield metrics 644, as indicated by block 922. Operation yield logic 320 can generate an operation yield metric 620, as indicated by block 924. Operation duration logic 321 can generate an operation duration metric 621, as indicated by block 926. Operation yield flow rate logic 322 can generate an operation yield flow rate metric 622, as indicated by block 928. Sub-operation yield logic 323 can generate a sub-operation yield metric 623, as indicated by block 930. Sub-operation duration logic 324 can generate a sub-operation duration metric 624, as indicated by block 932. Sub-operation yield flow rate logic 325 can generate a sub-operation yield flow rate metric 625, as indicated by block 934. Upcoming yield logic 326 can generate an upcoming yield metric 626, as indicated by block 936. Upcoming duration logic 327 can generate an upcoming duration metric 627, as indicated by block 938. Upcoming yield flow rate logic 328 can generate an upcoming yield flow rate metric 628, as indicated by block 940. Yield flow rate logic 329 can generate a yield flow rate metric 629, as indicated by block 942. Tank capacity logic 330 can generate a tank capacity metric 630, as indicated by block 944. Tank fill level logic 331 can generate a tank fill level metric 631, as indicated by block 946. Base ETF logic 332 can generate a base ETF metric 632, as indicated by block 948. Crop moisture logic 333 can generate a crop (e.g., grain) moisture metric 633, as indicated by block 950. Error correction logic 334 can generate an error correction metric 634, as indicated by block 952. Crop type logic 335 can generate a crop type metric 635, as indicated by block 954. In some examples, historical yield flow rate logic 336 can generate one or more historical yield flow rate metrics 636, as indicated by block 956. Temperature logic 345 can generate a temperature metric 645, as indicated by block 958. Humidity logic 346 can generate a humidity metric 646, as indicated by block 960. Path logic 338 can generate a path metric 638, as indicated by block 962. Travel speed logic 339 can generate a travel speed metric 639, as indicated by block 964. Machine full estimation system 310 can generate various other metrics, as indicated by block 965.

At block 966, machine full estimation system 310 generates an ETF metric 637 based on metrics generated at block 914 and the data obtained at block 902. Specifically, ETF logic 337 generates an ETF metric 637. As explained in FIG. 5, an ETF metric 637 can be based on a model 509, a base ETF metric 632, a crop moisture metric 633, an error correction metric 634, a crop type metric 635, a temperature metric 645, a humidity metric 646 and, in some examples, one or more historical yield flow rate metrics 636. Machine full estimation system 310 provides an output 350 indicating the ETF metric 637.

In some examples, at block 966, machine full estimation system 310 generates an EFL metric 640 based on metrics generated at block 914 and based on the ETF metric 637. Specifically, EFL logic 340 generates an EFL metric 640. As explained in FIG. 5, an EFL metric 640 can be based on a path metric 638, a travel speed metric 639, and an ETF metric 637. Machine full estimation system 310 can provide an output 350 indicating the EFL metric 640.

Additionally, machine full estimation system 310 can provide an output 350 indicating one or more of the other metrics generated at block 914. In some examples, machine full estimation system 310 can provide an output indicating the ETF metric 637 or the EFL metric 640, or both, and, in some examples, one or more of the other metrics generated at block 914.

Optionally, at block 968, control output system 312 can generate one or more outputs 355 based on the output(s) 350 (e.g., ETF metrics 637, EFL metrics 640, etc.) of machine full estimation system 310. For example, planning, scheduling, forecasting, and distribution logic 352 can generate, as outputs 355, one or more planning, scheduling, forecasting, and distribution outputs (such as one or more of those discussed in FIG. 4, as well as others), as indicated by block 969. Alert logic 354 can generate, as outputs 355, one or more alerts (such as those as discussed in FIG. 4, as well as others), as indicated by block 970. Settings logic 358 can generate, as outputs 355, one or more settings outputs (such as those discussed in FIG. 4, as well as others), as indicated by block 971. Control output system 312 can generate various other outputs as indicated by block 972.

At block 974 a respective control system 414 of each of one or more agricultural harvesters 100 generates one or more control signals to control one or more components of worksite operation system architecture 500 based on the outputs 350 (e. g., ETF metrics 637, EFL metrics 640, etc.), or, where optional block 968 is executed, based on the outputs 355, or both. For example, as indicated by block 975, each of one or more control systems 414 can generate one or more control signals to control a propulsion subsystem 450 to control a travel speed of an agricultural harvester 100. As indicated by block 976, each of one or more control systems 414 can generate one or more control signals to control a steering subsystem 452 to control a heading (or route) of an agricultural harvester 100. As indicated by block 977, each of one or more control systems 414 can generate one or more control signals to control one or more actuators 454 to control various settings of an agricultural harvester 100. As indicated by block 978, each of one or more control systems 414 can generate one or more control signals to control one or more interface mechanisms (e.g., 418 or 364, or both) to generate indications, such as displays (e.g., interface display 700, etc.), or other indications. As indicated by block 979, each of one or more control systems 414 can generate one or more control signals to control various other components of worksite operation system architecture 500, including, but not limited to various other controllable subsystems 456.

Additionally, or alternatively, at block 974 a respective control system 214 of each of one or more material receiving machines 200 generates one or more control signals to control one or more components of worksite operation system architecture 500 based on the outputs 350 (e. g., ETF metrics 637, EFL metrics 640, etc.), or, where optional block 968 is executed, based on the outputs 355, or both. For example, as indicated by block 975, each of one or more control systems 214 can generate one or more control signals to control a propulsion subsystem 250 to control a travel speed of a material receiving machine 200. As indicated by block 976, each of one or more control systems 214 can generate one or more control signals to control a steering subsystem 252 to control a heading (or route) of a material receiving machine 200. As indicated by block 978, each of one or more control systems 214 can generate one or more control signals to control one or more interface mechanisms (e.g., 218 or 364, or both) to generate indications, such as displays (e. g., interface display 700, etc.), or other indications. As indicated by block 979, each of one or more control systems 214 can generate one or more control signals to control various other components of worksite operation system architecture 500, including, but not limited to various other controllable subsystems 256.

At block 980 it is determined if the operation 900 has been completed. If, at block 950, it is determined that that operation 900 has been completed, then operation 900 ends. If, at block 950, it is determined that the operation 900 has not been completed (e.g., the worksite operation is still underway, for instance, a subsequent sub-operation is underway) then operation 900 proceeds at block 952.

At block 982 additional data is obtained (e. g., received, retrieved, generated, etc.). For example, additional sensor data 502 may be generated as the operation continues, as indicated by block 954. Various other data might be updated or additionally generated, since the time the data at block 902 was obtained, and can be obtained, as indicated by block 955. For instance, additional or updated worksite data 502 may be obtained, additional or updated machine data 506 may be obtained, additional or updated historical data 508 may be obtained, additional or updated models 509 may be obtained, and various other additional or updated data (e.g., additional or updated data 510) may be obtained.

Operation 900 returns to block 914 where machine full estimation system 310 carries out its operation based, at least in part, on the additional or updated data obtained at block 982.

The present discussion has mentioned processors and servers. In one example, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted the data stores can each be broken into multiple data stores. In some examples, one or more of the data stores may be local to the systems accessing the data stores, one or more of the data stores may all be located remote form a system utilizing the data store, or one or more data stores may be local while others are remote. All of these configurations are contemplated by the present disclosure.

Also, the figures show a number of blocks with functionality ascribed to each block. It will be noted that fewer blocks can be used to illustrate that the functionality ascribed to multiple different blocks is performed by fewer components. Also, more blocks can be used illustrating that the functionality may be distributed among more components. In different examples, some functionality may be added, and some may be removed.

It will be noted that the above discussion has described a variety of different systems, controllers, logic, components, and interactions. It will be appreciated that such systems, controllers, logic, components, and interactions can be comprised of or implemented by hardware items (such as processors and associated memory, or other processing components, some of which are described below) that perform the functions associated with those systems, controllers, logic, components, and interactions. In addition, systems, controllers, logic, components, and interactions can be comprised of or implemented by software that is loaded into a memory and is subsequently executed by a processor or server, or other computing component, as described below. The systems, controllers, logic, components, and interactions can also be comprised of or implemented by different combinations of hardware, software, firmware, etc., some examples of which are described below. These are only some examples of different structures that can be used to form or implement systems, controllers, logic, components, and interactions described above. Other structures can be used as well.

Additionally, various models have been discussed. Model implementations may be mathematical, making use of mathematical equations, empirical correlations, statistics, tables, matrices, and the like. Other model implementations may rely more on symbols, knowledge bases, and logic such as rule-based systems. Some implementations are hybrid, utilizing both mathematics and logic. Some models may incorporate random, non-deterministic, or unpredictable elements. Some model implementations may make use of networks of data values such as neural networks. These are just some examples of models. Additionally, models may be generated in a variety of ways including with employment of artificial intelligence (e.g., machine learning, etc.) method, including, without limitation, memory networks, Bayes systems, decisions trees, Eigenvectors, Eigenvalues and Machine Learning, Evolutionary and Genetic Algorithms, Cluster Analysis, Expert Systems/Rules, Support Vector Machines, Engines/Symbolic Reasoning, Generative Adversarial Networks (GANs), Graph Analytics and ML, Linear Regression, Logistic Regression, LSTMs and Recurrent Neural Networks (RNNSs), Convolutional Neural Networks (CNNs), MCMC, Random Forests, Reinforcement Learning or Reward-based machine learning. Learning may be supervised or unsupervised.

Figure 10:
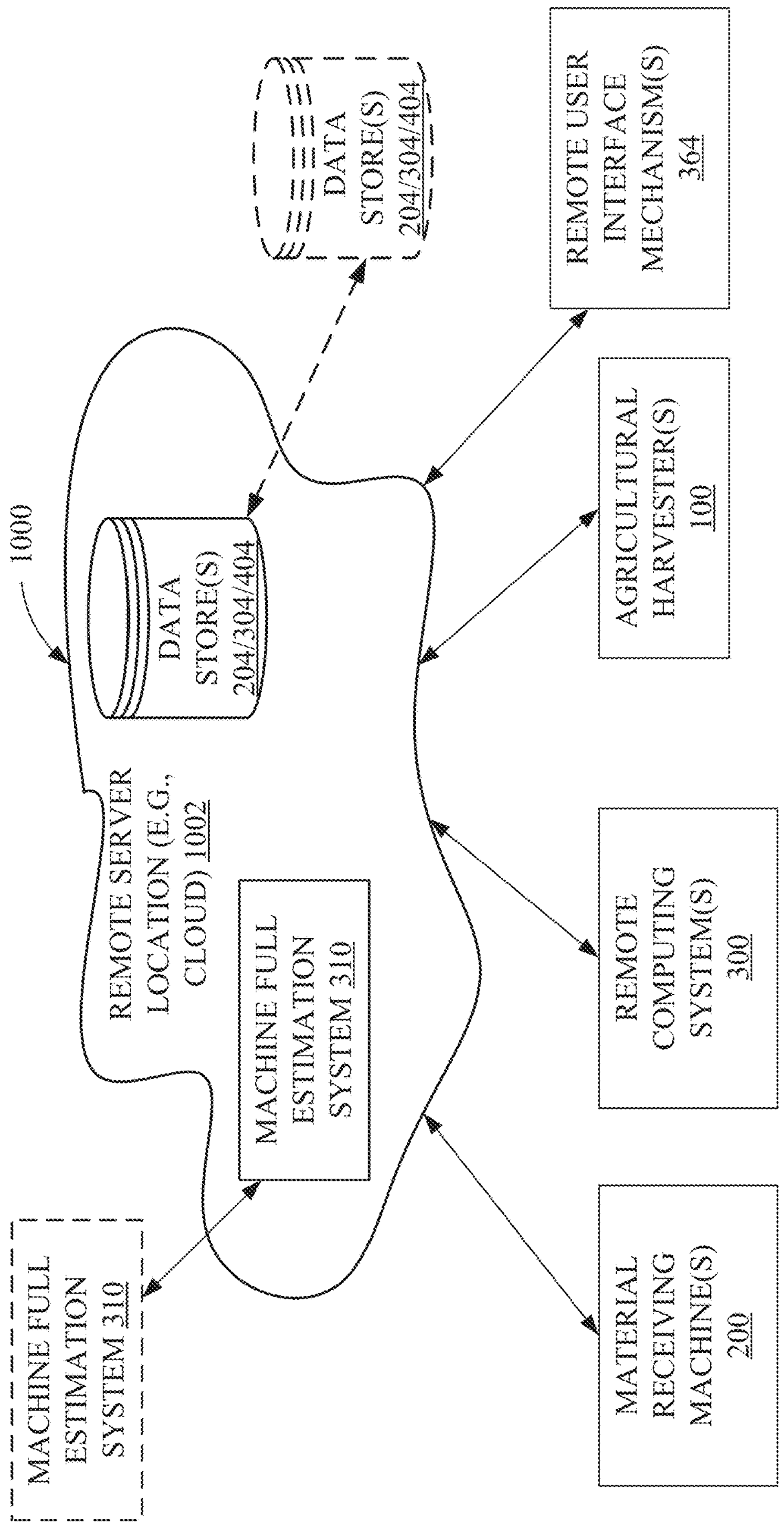
FIG. 10 is a block diagram showing one example of items of an agricultural worksite operation system architecture in communication with a remote server architecture.

FIG. 10 is a block diagram of a remote server architecture 1000. FIG. 10, also shows one or more agricultural harvesters 100, one or more material receiving machines 200, one or more remote computing systems 300, and one or more remote user interface mechanisms 364 in communication with the remote server environment. The agricultural harvesters 100, material receiving machines 200, remote computing systems 300, and remote user interface mechanisms 364 communicate with elements in a remote server architecture 1000. In some examples, remote server architecture 1000 provides computation, software, data access, and storage services that do not require end-user knowledge of the physical location or configuration of the system that delivers the services. In various examples, remote servers may deliver the services over a wide area network, such as the internet, using appropriate protocols. For instance, remote servers may deliver applications over a wide area network and may be accessible through a web browser or any other computing component. Software or components shown in previous figures as well as data associated therewith, may be stored on servers at a remote location. The computing resources in a remote server environment may be consolidated at a remote data center location, or the computing resources may be dispersed to a plurality of remote data centers. Remote server infrastructures may deliver services through shared data centers, even though the services appear as a single point of access for the user. Thus, the components and functions described herein may be provided from a remote server at a remote location using a remote server architecture. Alternatively, the components and functions may be provided from a server, or the components and functions can be installed on client devices directly, or in other ways.

In the example shown in FIG. 10, some items are similar to those shown in previous figures and those items are similarly numbered. FIG. 10 specifically shows that machine full estimation system 310, data stores 204, data stores 304, or data stores 404, or a combination thereof, may be located at a server location 1002 that is remote from the agricultural harvesters 100, material receiving machines 200, remote computing systems 300, and remote user interface mechanisms 364. Therefore, in the example shown in FIG. 10, agricultural harvesters 100, material receiving machines 200, remote computing systems 300, and remote user interface mechanisms 364 access systems through remote server location 1002. In other examples, various other items may also be located at server location 1002, such as various other items of worksite operation system architecture 500, such as, but not limited to, control output system 312.

FIG. 10 also depicts another example of a remote server architecture. FIG. 10 shows that some elements of previous figures may be disposed at a remote server location 1002 while others may be located elsewhere. By way of example, one or more of data store(s) 204, 304, and 404 may be disposed at a location separate from location 1002 and accessed via the remote server at location 1002. Similarly, machine full estimation system 310 may be disposed at a location separate from location 1002 and accessed via the remote server at location 1002. Regardless of where the elements are located, the elements can be accessed directly by agricultural harvesters 100, material receiving machines 200, remote computing systems 300, and remote user interface mechanisms 364 through a network such as a wide area network or a local area network; the elements can be hosted at a remote site by a service; or the elements can be provided as a service or accessed by a connection service that resides in a remote location. Also, data may be stored in any location, and the stored data may be accessed by, or forwarded to, operators, users, or systems. For instance, physical carriers may be used instead of, or in addition to, electromagnetic wave carriers. In some examples, where wireless telecommunication service coverage is poor or nonexistent, another machine, such as a fuel truck or other mobile machine or vehicle, may have an automated, semi-automated or manual information collection system. As a mobile machine (e. g., agricultural harvester 100 or material receiving machine 200) comes close to the machine containing the information collection system, such as a fuel truck prior to fueling, the information collection system collects the information from the mobile machine (e.g., agricultural harvester 100 or material receiving machine 200) using any type of ad-hoc wireless connection. The collected information may then be forwarded to another network when the machine containing the received information reaches a location where wireless telecommunication service coverage or other wireless coverage is available. For instance, a fuel truck may enter an area having wireless communication coverage when traveling to a location to fuel other machines or when at a main fuel storage location. All of these architectures are contemplated herein. Further, the information may be stored on a mobile machine (e.g., agricultural harvester 100 or material receiving machine 200) until the mobile machine enters an area having wireless communication coverage. The mobile machine (e.g., agricultural harvester 100 or material receiving machine 200), itself, may send the information to another network.

It will also be noted that the elements of previous figures, or portions thereof, may be disposed on a wide variety of different devices. One or more of those devices may include an on-board computer, an electronic control unit, a display unit, a server, a desktop computer, a laptop computer, a tablet computer, or other mobile device, such as a palm top computer, a cell phone, a smart phone, a multimedia player, a personal digital assistant, etc.

In some examples, remote server architecture 1000 may include cybersecurity measures. Without limitation, these measures may include encryption of data on storage devices, encryption of data sent between network nodes, authentication of people or processes accessing data, as well as the use of ledgers for recording metadata, data, data transfers, data accesses, and data transformations. In some examples, the ledgers may be distributed and immutable (e.g., implemented as blockchain).

Figure 11:
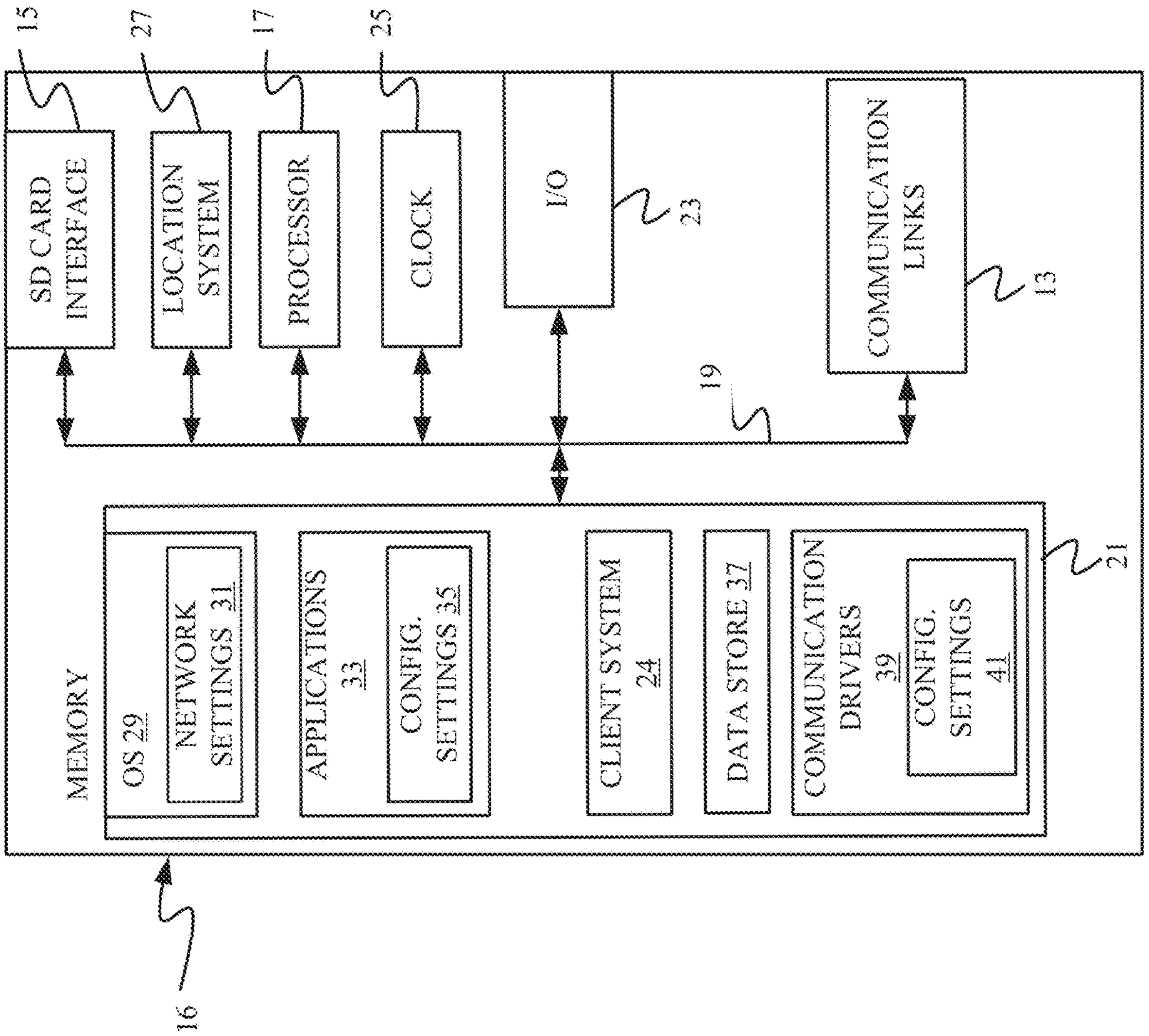
FIGS. 11-13 show examples of mobile devices that can be used in an agricultural worksite operation system architecture.
Figure 12:
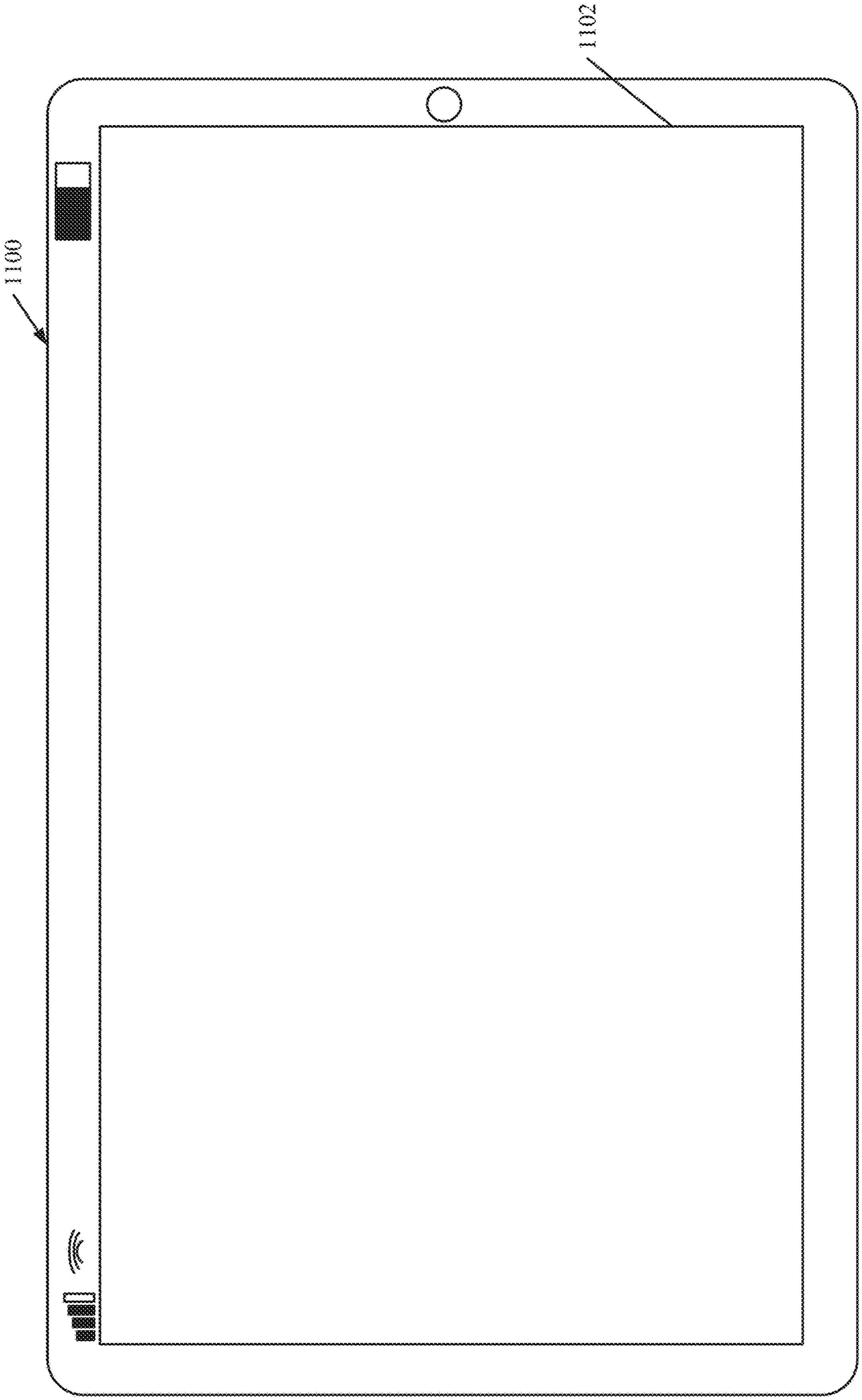
Figure 13:
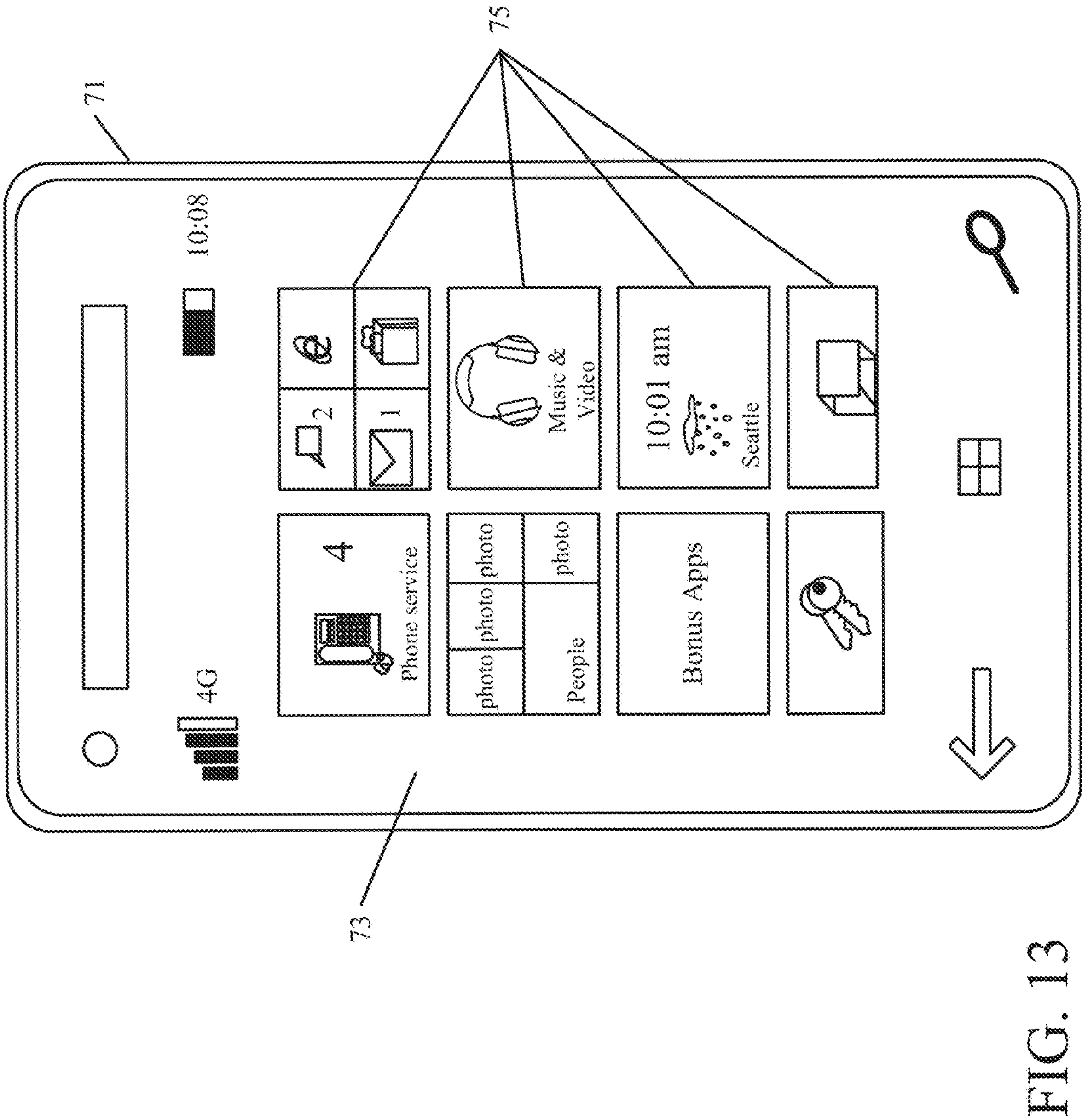

FIG. 11 is a simplified block diagram of one illustrative example of a handheld or mobile computing device that can be used as a user's or client's handheld device 16, in which the present system (or parts of it) can be deployed. For instance, a mobile device can be deployed in the operator compartment of a mobile machine (e.g., agricultural harvester 100 or material receiving machine 200) for use in generating, processing, or displaying the outputs (e.g., 350 or 355, or both) discussed above. FIGS. 12-13 are examples of handheld or mobile devices.

FIG. 11 provides a general block diagram of the components of a client device 16 that can run some components shown in previous figures, that interacts with them, or both. In the device 16, a communications link 13 is provided that allows the handheld device to communicate with other computing devices and under some examples provides a channel for receiving information automatically, such as by scanning. Examples of communications link 13 include allowing communication though one or more communication protocols, such as wireless services used to provide cellular access to a network, as well as protocols that provide local wireless connections to networks.

In other examples, applications can be received on a removable Secure Digital (SD) card that is connected to an interface 15. Interface 15 and communication links 13 communicate with a processor 17 (which can also embody processors or servers from other figures) along a bus 19 that is also connected to memory 21 and input/output (I/O) components 23, as well as clock 25 and location system 27.

I/O components 23, in one example, are provided to facilitate input and output operations. I/O components 23 for various examples of the device 16 can include input components such as buttons, touch sensors, optical sensors, microphones, touch screens, proximity sensors, accelerometers, orientation sensors and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. Location system 27 can also include, for example, mapping software or navigation software that generates desired maps, navigation routes and other geographic functions.

Memory 21 stores operating system 29, network settings 31, applications 33, application configuration settings 35, client system 24, data store 37, communication drivers 39, and communication configuration settings 41. Memory 21 can include all types of tangible volatile and non-volatile computer-readable memory devices. Memory 21 may also include computer storage media (described below). Memory 21 stores computer readable instructions that, when executed by processor 17, cause the processor to perform computer-implemented steps or functions according to the instructions. Processor 17 may be activated by other components to facilitate their functionality as well.

FIG. 12 shows one example in which device 16 is a tablet computer 1100. In FIG. 12, computer 1100 is shown with user interface display screen 1102. Screen 1102 can be a touch screen or a pen-enabled interface that receives inputs from a pen or stylus. Tablet computer 1100 may also use an on-screen virtual keyboard. Of course, computer 1100 might also be attached to a keyboard or other user input device through a suitable attachment mechanism, such as a wireless link or USB port, for instance. Computer 1100 may also illustratively receive voice inputs as well.

FIG. 13 is similar to FIG. 12 except that the device is a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 14:
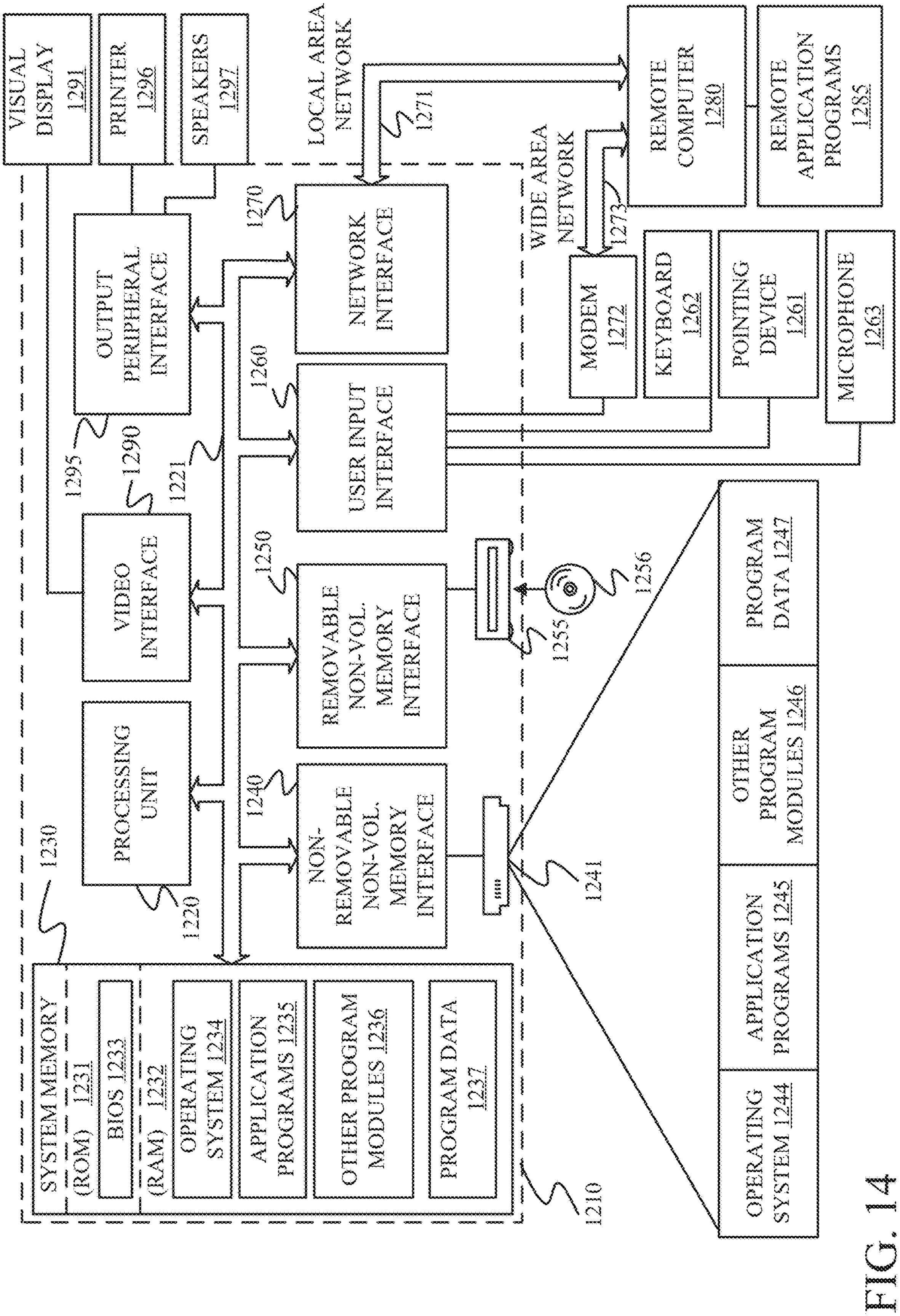
FIG. 14 is a block diagram showing one example of a computing environment that can be used in an agricultural worksite operation system architecture.

FIG. 14 is one example of a computing environment in which elements of previous figures described herein can be deployed. With reference to FIG. 14, an example system for implementing some embodiments includes a computing device in the form of a computer 1210 programmed to operate as discussed above. Components of computer 1210 may include, but are not limited to, a processing unit 1220 (which can comprise processors or servers from previous figures), a system memory 1230, and a system bus 1221 that couples various system components including the system memory to the processing unit 1220. The system bus 1221 may be any of several types of bus structures including a memory bus or memory controller, a peripheral bus, and a local bus using any of a variety of bus architectures. Memory and programs described with respect to previous figures described herein can be deployed in corresponding portions of FIG. 14.

Computer 1210 typically includes a variety of computer readable media. Computer readable media may be any available media that can be accessed by computer 1210 and includes both volatile and nonvolatile media, removable and non-removable media. By way of example, and not limitation, computer readable media may comprise computer storage media and communication media. Computer storage media is different from, and does not include, a modulated data signal or carrier wave. Computer readable media includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 1210. Communication media may embody computer readable instructions, data structures, program modules or other data in a transport mechanism and includes any information delivery media. The term "modulated data signal" means a signal that has one or more of its characteristics set or changed in such a manner as to encode information in the signal.

The system memory 1230 includes computer storage media in the form of volatile and/or nonvolatile memory or both such as read only memory (ROM) 1231 and random access memory (RAM) 1232. A basic input/output system 1233 (BIOS), containing the basic routines that help to transfer information between elements within computer 1210, such as during start-up, is typically stored in ROM 1231. RAM 1232 typically contains data or program modules or both that are immediately accessible to and/or presently being operated on by processing unit 1220. By way of example, and not limitation, FIG. 14 illustrates operating system 1234, application programs 1235, other program modules 1236, and program data 1237.

The computer 1210 may also include other removable/non-removable volatile/nonvolatile computer storage media. By way of example only, FIG. 14 illustrates a hard disk drive 1241 that reads from or writes to non-removable, nonvolatile magnetic media, an optical disk drive 1255, and nonvolatile optical disk 1256. The hard disk drive 1241 is typically connected to the system bus 1221 through a non-removable memory interface such as interface 1240, and optical disk drive 1255 are typically connected to the system bus 1221 by a removable memory interface, such as interface 1250.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (e.g., ASICs), Application-specific Standard Products (e. g., ASSPs), System-on-a-chip systems (SOCs), Complex Programmable Logic Devices (CPLDs), quantum computers, etc.

The drives and their associated computer storage media discussed above and illustrated in FIG. 14, provide storage of computer readable instructions, data structures, program modules and other data for the computer 1210. In FIG. 14, for example, hard disk drive 1241 is illustrated as storing operating system 1244, application programs 1245, other program modules 1246, and program data 1247. Note that these components can either be the same as or different from operating system 1234, application programs 1235, other program modules 1236, and program data 1237.

A user may enter commands and information into the computer 1210 through input devices such as a keyboard 1262, a microphone 1263, and a pointing device 1261, such as a mouse, trackball or touch pad. Other input devices (not shown) may include a joystick, game pad, satellite dish, scanner, or the like. These and other input devices are often connected to the processing unit 1220 through a user input interface 1260 that is coupled to the system bus, but may be connected by other interface and bus structures. A visual display 1291 or other type of display device is also connected to the system bus 1221 via an interface, such as a video interface 1290. In addition to the monitor, computers may also include other peripheral output devices such as speakers 1297 and printer 1296, which may be connected through an output peripheral interface 1295.

The computer 1210 is operated in a networked environment using logical connections (such as a controller area network—CAN, local area network—LAN, or wide area network WAN) to one or more remote computers, such as a remote computer 1280.

When used in a LAN networking environment, the computer 1210 is connected to the LAN 1271 through a network interface or adapter 1270. When used in a WAN networking environment, the computer 1210 typically includes a modem 1272 or other means for establishing communications over the WAN 1273, such as the Internet. In a networked environment, program modules may be stored in a remote memory storage device. FIG. 14 illustrates, for example, that remote application programs 1285 can reside on remote computer 1280.

It should also be noted that the different examples described herein can be combined in different ways. That is, parts of one or more examples can be combined with parts of one or more other examples. All of this is contemplated herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of the claims.

What is claimed is:

1. An agricultural worksite operation system comprising:

one or more processors;

memory; and computer executable instructions, stored in the memory, and executable by the one or more processors, the computer executable instructions, when executed by the one or more processors, configure the one or more processors to:

identify a yield flow rate metric indicative of a rate at which an agricultural harvester harvests crop at a worksite;

identify a tank capacity metric, the tank capacity metric indicative of an amount of capacity, at least to a threshold level, of a tank of the agricultural harvester;

identify a tank fill level metric indicative of a fill level of the tank of the agricultural harvester;

identify a crop moisture metric indicative of moisture of crops at the worksite;

identify an error correction metric indictive of an error in a fill level calculation;

identify a crop type metric indicative of a crop type of crop at the worksite;

identify a temperature metric indicative of an ambient temperature at the worksite;

identify a humidity metric indicative of an ambient humidity at the worksite;

identify an estimated time until full (ETF) metric indicative of an estimated time it will take until the tank of the agricultural harvester is full, at least to the threshold level, based on the yield flow rate metric, the tank capacity metric, the tank fill level metric, the crop moisture metric, the error correction metric, the crop type metric, the temperature metric, the humidity metric, and a model; and control an agricultural worksite operation based on the ETF metric.

2. The worksite operation system of claim 1, wherein the control comprises control of one or more of:

a controllable subsystem of the agricultural harvester;

a display screen to display an interface indicative of the ETF metric; or a controllable subsystem of a material receiving machine.

3. The worksite operation system of claim 1, wherein the computer executable instructions, when executed by the one or more processors, further configure the one or more processors to:

identify a path metric indicative of an upcoming travel path of the agricultural harvester;

identify a travel speed metric indicative of an estimated travel speed of the agricultural harvester along the upcoming travel path; and identify an estimated full location (EFL) metric, indicative of an estimated location at the worksite at which the tank of the agricultural harvester will be full, at least to the threshold level, based on the path metric, the travel speed metric, and the ETF metric.

4. The worksite operation system of claim 3, wherein the computer executable instructions, when executed by the one or more processors, further configure the one or more processors to control the agricultural worksite operation based on the EFL metric.

5. The worksite operation system of claim 3, wherein the computer executable instructions, when executed by the one or more processors, further configure the one or more processors to, based on the EFL metric, control one or more of:

a controllable subsystem of the agricultural harvester;

a controllable subsystem of a material receiving machine; or a display screen to display an interface indicative of the EFL metric.

6. The worksite operation system of claim 3, wherein the computer executable instructions, when executed by the one or more processors, further configure the one or more processors to:

identify, based on the EFL metric, a suggested unload location indicative of a suggested location at the worksite at which to begin an unload operation during which the agricultural harvester transfers crop to a material receiving machine; and control the material receiving machine based on the suggested unload location.

7. The worksite operation system of claim 1, wherein the computer executable instructions, when executed by the one or more processors, further configure the one or more processors to:

identify an operation yield flow rate based on an operation yield metric and an operation duration metric;

identify a sub-operation yield flow rate based on a sub-operation yield metric and a sub-operation duration metric;

identify an upcoming yield flow rate based on an upcoming yield metric and an upcoming operation duration metric; and identify the yield flow rate metric based on the operation yield flow rate metric, the sub-operation yield flow rate metric; and the upcoming yield flow rate metric.

8. The worksite operation system of claim 1, wherein the computer executable instructions, when executed by the one or more processors, further configure the one or more processors to:

identify a base ETF metric based on the yield flow rate metric, the tank capacity metric, and the tank fill level metric, the base ETF metric indicative of an initial estimated time it will take until the tank of the agricultural harvester is full, at least to the threshold level, wherein the model is configured to receive, as model inputs, the base ETF metric, the crop moisture metric, the error correction metric, the crop type metric, the temperature metric, and the humidity metric and to generate, as a model output, the ETF metric.

9. The worksite operation system of claim 8, wherein the computer executable instructions, when executed by the one or more processors, further configure the one or more processors to:

identify a base ETF metric based on the yield flow rate metric, the tank capacity metric, and the tank fill level metric, the base ETF metric indicative of an initial estimated time it will take until the tank of the agricultural harvester is full, at least to the threshold level; and identify one or more historical yield flow rate metrics, the one or more historical yield flow rate metrics indicative of yield flow rate metrics during one or more previous operations, wherein the model is configured to receive, as model inputs, the base ETF metric, the crop moisture metric, the error correction metric, the crop type metric, the temperature metric, the humidity metric, and the one or more historical yield flow rate metrics, and to generate, as a model output, the ETF metric.

10. The worksite operation system of claim 1, wherein the model comprises a gradient boosting decision tree.

11. A computer implement method comprising:

identifying a yield flow rate metric indicative of a rate at which an agricultural harvester harvests crop at a worksite;

identifying a tank capacity metric, the tank capacity metric indicative of an amount of capacity, at least to a threshold level, of a tank of the agricultural harvester;

identifying a tank fill level metric indicative of a fill level of the tank of the agricultural harvester;

identifying a crop moisture metric indicative of moisture of crop at the worksite;

identifying an error correction metric indictive of an error in a fill level calculation;

identifying a crop type metric indicative of a crop type of crop at the worksite;

identifying a temperature metric indicative of an ambient temperature at the worksite;

identifying a humidity metric indicative of an ambient humidity at the worksite;

identifying an estimated time until full (ETF) metric indicative of an estimated time it will take until the tank of the agricultural harvester is full, at least to the threshold level, based on the yield flow rate metric, the tank capacity metric, the tank fill level metric, the crop moisture metric, the error correction metric, the crop type metric, the temperature metric, the humidity metric, and a model; and controlling an agricultural worksite operation based on the ETF metric.

12. The computer implemented method of claim 11, wherein controlling the agricultural worksite operation comprises one or more of:

generating a first control signal to control a controllable subsystem of the agricultural harvester;

generating a second control signal to control a display screen to display an interface indicative of the ETF metric; or generating a third control signal to control a controllable subsystem of a material receiving machine.

13. The computer implemented method of claim 11 and further comprising:

identifying a path metric indicative of an upcoming travel path of the agricultural harvester;

identifying a travel speed metric indicative of an estimated travel speed of the agricultural harvester along the upcoming travel path; and identifying an estimated full location (EFL) metric, indicative of an estimated location at the worksite at which the tank of the agricultural harvester will be full, at least to the threshold level, based on the path metric, the travel speed metric, and the ETF metric.

14. The computer implemented method of claim 13, wherein controlling comprises controlling the agricultural worksite operation based on the EFL metric.

15. The computer implemented method of claim 13, and further comprising controlling, based on the EFL metric, one or more of:

a controllable subsystem of the agricultural harvester;

a controllable subsystem of a material receiving machine; or a display screen to display an interface indicative of the EFL metric.

16. The computer implemented method of claim 13 and further comprising:

identifying, based on the EFL metric, a suggested unload location indicative of a suggested location at the worksite at which to begin an unload operation during which the agricultural harvester transfers crop to a material receiving machine; and controlling the material receiving machine based on the suggested unload location.

17. The computer implemented method of claim 11 and further comprising:

identifying an operation yield flow rate based on an operation yield metric and an operation duration metric;

identifying a sub-operation yield flow rate based on a sub-operation yield metric and a sub-operation duration metric;

identifying an upcoming yield flow rate based on an upcoming yield metric and an upcoming operation duration metric; and identifying the yield flow rate metric based on the operation yield flow rate metric, the sub-operation yield flow rate metric; and the upcoming yield flow rate metric.

18. The computer implemented method of claim 11 and further comprising:

identifying a base ETF metric based on the yield flow rate metric, the tank capacity metric, and the tank fill level metric, the base ETF metric indicative of an initial estimated time it will take until the tank of the agricultural harvester is full, at least to the threshold level, wherein identifying the ETF metric comprises providing to the model, as model inputs, the base ETF metric, the crop moisture metric, the error correction metric, the crop type metric, the temperature metric, and the humidity metric, to generate, as a model output, the ETF metric.

19. The computer implemented method of claim 11, and comprising:

identifying a base ETF metric based on the yield flow rate metric, the tank capacity metric, and the tank fill level metric, the base ETF metric indicative of an initial estimated time it will take until the tank of the agricultural harvester is full, at least to the threshold level; and identifying one or more historical yield flow rate metrics, the one or more historical yield flow rate metrics indicative of yield flow rate metrics during one or more previous operations, wherein identifying the ETF metric comprises providing to the model, as model inputs, the base ETF metric, the crop moisture metric, the error correction metric, the crop type metric, the temperature metric, the humidity metric, and the one or more historical yield flow rate metrics, to generate, as a model output, the ETF metric.

20. An agricultural worksite operation system comprising:

one or more processors;

memory; and computer executable instructions, stored in the memory, and executable by the one or more processors, the computer executable instructions, when executed by the one or more processors, configure the one or more processors to:

identify an operation yield metric indicative of a total amount of crop harvested up to a given time in an operation;

identify an operation duration metric indicative of a duration of the operation up to the given time;

identify an operation yield flow rate metric indicative of rate at which an agricultural harvester harvests in the operation based on the operation yield metric and the operation duration metric;

identify a sub-operation yield metric indicative of a total amount of crop harvested during a sub-operation up to the given time;

identify a sub-operation duration metric indicative of a duration of a sub-operation up to the given time;

identify a sub-operation yield flow rate metric indicative of a rate at which the agricultural harvester harvests in the sub-operation based on the sub-operation yield metric and the sub-operation duration metric;

identify an upcoming yield metric indicative of an estimated total amount of crop in an upcoming area of a worksite;

identify an upcoming duration metric indicative of an estimated time for the agricultural harvester to harvest the upcoming area of the worksite;

identify an upcoming yield flow rate metric indicative of an estimated rate at which the agricultural harvester will harvest crop in the upcoming area of the worksite;

identify a yield flow rate metric indicative of a rate at which an agricultural harvester harvests crop at the worksite based on the operation yield flow rate metric, the sub-operation yield flow rate metric, and the upcoming yield flow rate metric;

identify a tank capacity metric, the tank capacity metric indicative of an amount of capacity of a tank of the agricultural harvester at least to a threshold level of fill of the tank of the agricultural harvester;

identify a tank fill level metric indicative of a fill level of the tank of the agricultural harvester;

identify a base estimated time until full (ETF) based on the yield flow rate metric, the tank capacity metric, and the tank fill level metric, the base ETF metric indicative of a first estimated time it will take until the tank of the agricultural harvester is full, at least to the threshold level;

identify a crop moisture metric indicative of an average moisture of crop at the worksite during the sub-operation;

identify an error correction metric indictive of an error in a fill level calculation for a previous sub-operation;

identify a crop type metric indicative of a crop type of crop at the worksite;

identify a temperature metric indicative of an average ambient temperature at the worksite during the sub-operation;

identify a humidity metric indicative of an average ambient humidity at the worksite during the sub-operation;

identify an estimated time until full (ETF) metric based on the base ETF metric, the yield flow rate metric, the tank capacity metric, the tank fill level metric, the crop moisture metric, the error correction metric, the crop type metric, the temperature metric, the humidity metric, and a model, the ETF metric indicative of a second estimated time it will take until the tank of the agricultural harvester is full, at least to the threshold level; and control an agricultural worksite operation based on the ETF metric.

21. The agricultural worksite operation system of claim 20, wherein the computer executable instructions, when executed by the one or more processors, further configure the one or more processors to:

identify a path metric indicative of an upcoming travel path of the agricultural harvester;

identify a travel speed metric indicative of an estimated travel speed of the agricultural harvester along the upcoming travel path; and identify an estimated full location (EFL) metric, indicative of an estimated location at the worksite at which the tank of the agricultural harvester will be full, at least to the threshold level, based on the path metric, the travel speed metric, and the ETF metric.

* * * * *